United States Patent
Lim et al.

(10) Patent No.: US 9,736,648 B2
(45) Date of Patent: Aug. 15, 2017

(54) METHOD FOR MEASURING LOCATION OF USER EQUIPMENT IN WIRELESS ACCESS SYSTEM AND APPARATUS THEREFOR

(71) Applicant: LG ELECTRONICS INC., Seoul (KR)

(72) Inventors: Suhwan Lim, Anyang-si (KR); Manyoung Jung, Anyang-si (KR); Yoonoh Yang, Anyang-si (KR); Sangwook Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 169 days.

(21) Appl. No.: 14/377,815

(22) PCT Filed: Mar. 13, 2013

(86) PCT No.: PCT/KR2013/002020
§ 371 (c)(1),
(2) Date: Aug. 8, 2014

(87) PCT Pub. No.: WO2013/137645
PCT Pub. Date: Sep. 19, 2013

(65) Prior Publication Data
US 2016/0050534 A1    Feb. 18, 2016

Related U.S. Application Data

(60) Provisional application No. 61/609,949, filed on Mar. 13, 2012, provisional application No. 61/611,025, filed on Mar. 15, 2012.

(51) Int. Cl.
*H04W 4/02*   (2009.01)
*H04W 64/00*   (2009.01)
(Continued)

(52) U.S. Cl.
CPC .......... *H04W 4/025* (2013.01); *G01S 5/0236* (2013.01); *G01S 5/10* (2013.01); *H04L 5/0048* (2013.01); *H04W 24/08* (2013.01); *H04W 64/00* (2013.01)

(58) Field of Classification Search
CPC ........ G01S 5/0236; G01S 5/10; H04W 24/08; H04W 4/025; H04W 64/00; H04L 5/0048
See application file for complete search history.

(56) References Cited

U.S. PATENT DOCUMENTS

2011/0105144 A1 *  5/2011  Siomina ................ G01S 5/0215
                                                                 455/456.1
2011/0117925 A1    5/2011  Sampath et al.
(Continued)

FOREIGN PATENT DOCUMENTS

JP      2010-515920      5/2010
KR   10-2011-0084317    7/2011
(Continued)

OTHER PUBLICATIONS

PCT International Application No. PCT/KR2013/002020, Written Opinion of the International Searching Authority dated Jul. 26, 2013, 14 pages.
(Continued)

*Primary Examiner* — Walter Divito
*Assistant Examiner* — Anthony Luo
(74) *Attorney, Agent, or Firm* — Lee Hong Degerman Kang Waimey

(57) ABSTRACT

The present invention relates to a method for measuring a location of a user equipment in a wireless access system for supporting carrier aggregation/multiple cells and an apparatus therefor. Specifically, the method comprises the steps of: enabling the user equipment to receive information on Positioning Reference Signal (PRS) transmission band-
(Continued)

widths of a reference cell and a neighboring cell, enabling the user equipment to reconfigure an operating channel bandwidth of a Radio Frequency (RF) unit when one of the PRS transmission bandwidth of the reference cell and the PRS transmission bandwidth of the neighboring cell belongs to an inactive secondary cell, enabling the user equipment to receive the PRS from the reference cell and the neighboring cell, and enabling the user equipment to measure a Reference Signal Time Difference (RSTD) by using the PRS of the reference cell and the PRS of the neighboring cell.

4 Claims, 25 Drawing Sheets

(51) Int. Cl.
*G01S 5/02* (2010.01)
*G01S 5/10* (2006.01)
*H04L 1/00* (2006.01)
*H04W 24/08* (2009.01)
*H04L 5/00* (2006.01)

(56) References Cited

U.S. PATENT DOCUMENTS

2012/0015667 A1* 1/2012 Woo ............... G01S 5/0221
455/456.1
2012/0020298 A1* 1/2012 Shon ............... H04W 48/18
370/328
2012/0270572 A1* 10/2012 Siomina ............... G01S 5/10
455/456.6
2012/0282942 A1* 11/2012 Uusitalo ............ H04W 16/14
455/452.2

FOREIGN PATENT DOCUMENTS

| WO | 2010/138039 | 12/2010 |
| WO | 2011/021153 | 2/2011 |

OTHER PUBLICATIONS

PCT International Application No. PCT/KR2013/002020, Written Opinion of the International Searching Authority dated Jul. 26, 2013, 1 page.

* cited by examiner (a)

(b)

(a)

(b)

METHOD FOR MEASURING LOCATION OF USER EQUIPMENT IN WIRELESS ACCESS SYSTEM AND APPARATUS THEREFOR

CROSS-REFERENCE TO RELATED APPLICATIONS

This application is the National Stage filing under 35 U.S.C. 371 of International Application No. PCT/KR2013/002020, filed on Mar. 13, 2013, which claims the benefit of U.S. Provisional Application Ser. No. 61/609,949, filed on Mar. 13, 2012, and 61/611,025, filed on Mar. 15, 2012, the contents of which are all hereby incorporated by reference herein in their entirety.

TECHNICAL FIELD

The present invention relates to a wireless access system, and more particularly, to a method of measuring a location of a user equipment in a wireless access system supporting carrier aggregation/multiple cells and an apparatus therefor.

BACKGROUND ART

A mobile communication system is equipped with a function of calculating a location (or coordinate) of a user equipment to provide a LCS (location service) providing the location of the user equipment. Currently, there are various methods of calculating the location of the user equipment including a cell ID (identifier) method delivering an identifier of a cell to which the user equipment belongs thereto, a method of calculating the location of the user equipment via triangulation measuring time taken by a radio signal transmitted from the user equipment to arrive at each base station, a method of using a satellite and the like.

First of all, according to the cell ID-based (e.g., cell coverage) method, a location (or coordinate) of a user equipment can be measured by identifying a serving base station to which the user equipment belongs thereto. Information on the serving base station and a cell can be obtained in a manner of performing a paging procedure, a locating area update procedure, a cell update procedure, a URA (UTRA/UTRAN registration area) update procedure or a routing area update procedure.

Cell coverage based positioning information can be indicated by a geographical coordinate related to a serving cell or a cell identifier of a cell used as a service area identifier. The positioning information may include QoS (quality of service) estimation (e.g., related to obtained accuracy). If available, the positioning information may include a positioning method (or a list of the method) used for estimating a location.

When a geographical coordinate is used as location information, an estimated location of a user equipment may correspond to a fixed geographical coordinate in a serving cell (e.g., a coordinate of a serving base station), a geographical center of a serving cell coverage area or a different fixed coordinate in the cell coverage area. And, the geographical coordinate can be obtained by a combination of a cell-specific fixed geographical coordinate and different available information (e.g., RTT (round trip time) in a FDD system, recognition of user equipment timing advance in a TDD system, reception timing deviation measurement or the like).

According to the method of using a satellite, a user equipment should be equipped with a radio receiver capable of receiving a GNSS (global navigation satellite system) signal. As an example, the GNSS can include a GPS (global positioning system), Galileo system and the like. In order to determine a location of a user equipment, GNSSs (e.g., GPS, Galileo and the like) different from each other can be used in a manner of being individually or being combined with each other.

The method of using the triangulation technology can be classified into two types. One is a U-TDOA (uplink-time difference of arrival) positioning method and another one is a OTDOA-IPDL (observed time difference of arrival with network adjustable idle periods in downlink) method.

First of all, the U-TDOA positioning method is performed based on a measurement of a network measuring TOA (time of arrival) of a predetermined signal (e.g., a pilot signal, a reference signal), which is transmitted by a user equipment and received by a plurality of LMUs (location measurement units). In order to precisely measure a TOA of a burst (i.e., a predetermined signal) using the U-TDOA positioning method, it is required that a plurality of the LMUs to be geographically positioned in the vicinity of the user equipment. Since geographical coordinates of a plurality of the LMUs are known, a coordinate of the user equipment can be calculated using a hyperbolic trilateration scheme. In most cases, it is not necessary for a user equipment deeply positioned at a cell coverage radius to receive a signal from a different cell. It is necessary for the user equipment to listen to a signal from the different cell only when the user equipment moves to a cell coverage boundary and the user equipment can make a handover to the different cell. The aforementioned operation can be arranged to the U-TDOA positioning method, which needs to listen to at least one cell irrespective of a geographical location of a user equipment. Secondly, the OTDOA-IPDL method indicates a method of measuring a location of a user equipment using timing differences of which signals transmitted by each cell are arrived at the user equipment.

DISCLOSURE OF THE INVENTION

Technical Tasks

One object of the present invention is to propose a method of smoothly measuring a location of a user equipment in a wireless access system, preferably, in a wireless access system supporting carrier aggregation and an apparatus therefor.

Another object of the present invention is to propose a method of measuring RSTD according to an RF capability of a user equipment to satisfy a more enhanced RSDT (reference signal time difference) accuracy requirement in a wireless access system supporting carrier aggregation and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of measuring a location of a user equipment in a wireless access system supporting carrier aggregation includes the steps of receiving information on a PRS (positioning reference signal) transmission bandwidth of a reference cell and information on a PRS transmission bandwidth of a neighboring cell, which are received by the user equipment, if one of the PRS transmission bandwidth of the reference cell and the PRS transmission bandwidth of the neighboring cell belongs to a deactivated secondary cell, reconfiguring an operation channel bandwidth of an RF (radio frequency) unit, which is reconfigured by the user equipment, receiving a PRS from the reference cell and the neighboring cell, which is received by the user equipment, and measuring RSTD (reference signal time difference) using the PRS of the reference cell and the PRS of the neighboring cell, wherein a parameter for the RSTD is configured on the basis of a smallest bandwidth among a channel bandwidth of a serving cell, the PRS transmission bandwidth of the reference cell and the PRS transmission bandwidth of the neighboring cell and wherein the channel bandwidth of the serving cell is determined by one of a channel bandwidth of a primary cell and a channel bandwidth of the secondary cell.

To further achieve these and other advantages and in accordance with the purpose of the present invention, according to a different embodiment, a user equipment measuring a location of the user equipment in a wireless access system supporting carrier aggregation includes an RF (radio frequency) unit configured to transmit and receive a radio signal and a processor, the processor configured to receive information on a PRS (positioning reference signal) transmission bandwidth of a reference cell and information on a PRS transmission bandwidth of a neighboring cell, the processor, if one of the PRS transmission bandwidth of the reference cell and the PRS transmission bandwidth of the neighboring cell belongs to a deactivated secondary cell, configured to reconfigure an operation channel bandwidth of the RF (radio frequency) unit, the processor configured to receive a PRS from the reference cell and the neighboring cell, the processor configured to measure RSTD (reference signal time difference) using the PRS of the reference cell and the PRS of the neighboring cell, wherein a parameter for the RSTD is configured on the basis of a smallest bandwidth among a channel bandwidth of a serving cell, the PRS transmission bandwidth of the reference cell and the PRS transmission bandwidth of the neighboring cell and wherein the channel bandwidth of the serving cell is determined by one of a channel bandwidth of a primary cell and a channel bandwidth of the secondary cell.

Preferably, the RF operation channel bandwidth can be reconfigured in consideration of the channel bandwidth of the primary cell and the channel bandwidth of the secondary cell.

Preferably, the RF operation channel bandwidth can be reconfigured in consideration of the PRS transmission bandwidth of the reference cell.

Preferably, if a single RF unit is mounted on the user equipment, reconfiguration of the operation channel bandwidth can be permitted only when a measurement cycle of the secondary cell is greater than 640 ms.

Preferably, if a plurality of RF units are mounted on the user equipment, the operation channel bandwidth can be reconfigured by a biggest bandwidth among PRS channel bandwidths within an identical frequency for which each of a plurality of the RF units intend to measure.

Preferably, the parameter for the RSTD can include a parameter related to measurement accuracy of the RSTD and a parameter related to the number of subframes available for measurement of the RSTD.

Preferably, the information on the PRS transmission bandwidth of the reference cell and the information on the PRS transmission bandwidth of the neighboring cell can be transmitted via OTDOA (observed time difference of arrival) assistance data.

Advantageous Effects

According to embodiment of the present invention, it is able to smoothly measure a location of a user equipment in a wireless access system, preferably, in a wireless access system supporting carrier aggregation.

And, according to embodiment of the present invention, in case of measuring RSTD of a user equipment in a wireless access system supporting carrier aggregation, it is able to satisfy a more enhanced RSTD accuracy requirement.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
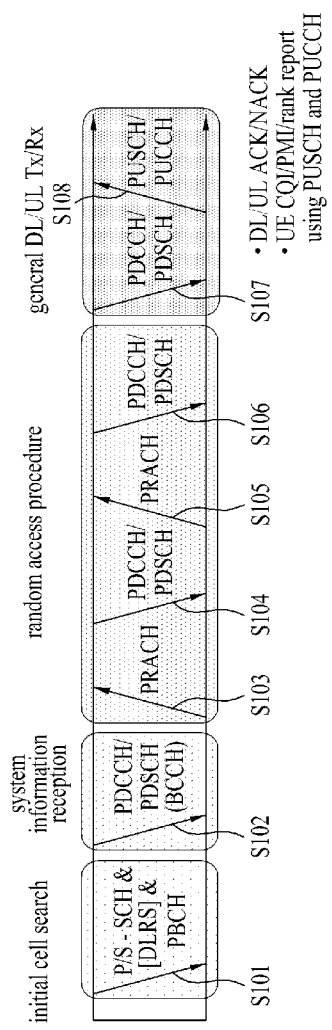
FIG. 1 is a diagram for explaining physical channels used for 3GPP LTE system and a general signal transmission method using the same.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

3GPP LTE/LTE-A System to which the Present Invention is Applicable

FIG. 1 is a diagram for explaining physical channels used for 3GPP system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a PBCH (physical broadcast channel) from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the base station [S103 to S106]. To this end, the user equipment may transmit a specific sequence as a preamble via a physical random access channel (PRACH) [S103] and may be then able to receive a response message via PDCCH and a corresponding PDSCH in response to the random access [S104]. In case of a contention based random access, it may be able to perform a contention resolution procedure such as a transmission S105 of an additional physical random access channel and a channel reception S106 of a physical downlink control channel and a corresponding physical downlink shared channel.

Having performed the above mentioned procedures, the user equipment may be able to perform a PDCCH/PDSCH reception S107 and a PUSCH/PUCCH (physical uplink shared channel/physical uplink control channel) transmission S108 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
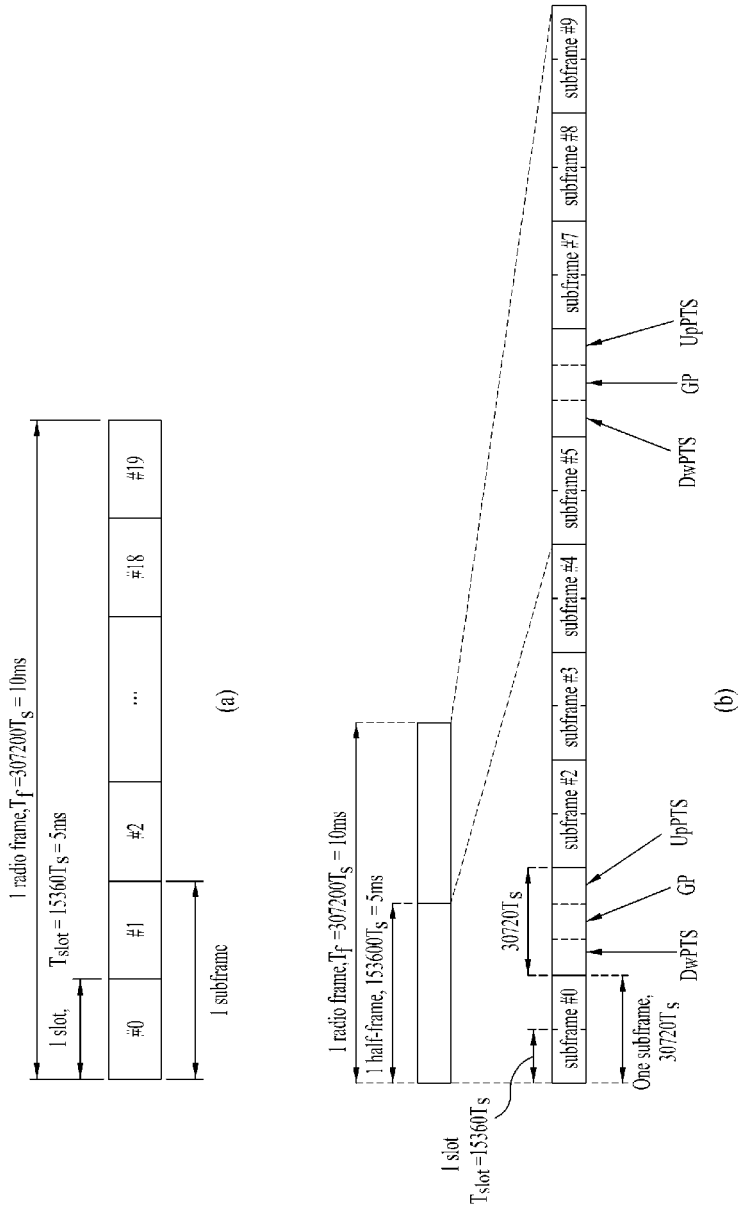
FIG. 2 is a diagram for a structure of a radio frame in 3GPP LTE.

FIG. 2 is a diagram for a structure of a radio frame in 3GPP LTE.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (a) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of a CP (cyclic prefix). The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2 (b) is a diagram for a structure of a downlink radio frame of type 2. A type-2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
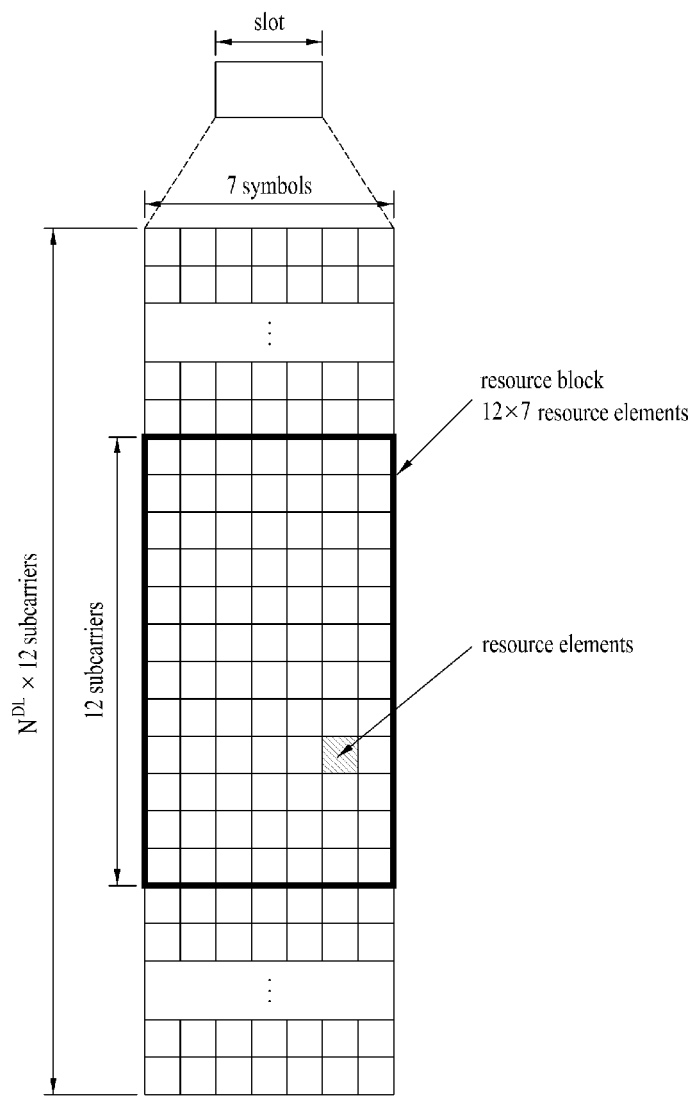
FIG. 3 is a diagram for one example of a resource grid for a downlink slot.

FIG. 3 is a diagram for one example of a resource grid for one downlink (DL) slot.

Referring to FIG. 3, one downlink (DL) slot may include a plurality of OFDM symbols in time domain. In particular, one DL slot exemplarily includes 7 OFDM symbols and one resource block (RB) exemplarily includes 12 subcarriers in frequency domain, by which the present invention may be non-limited.

Each element on a resource grid is called a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
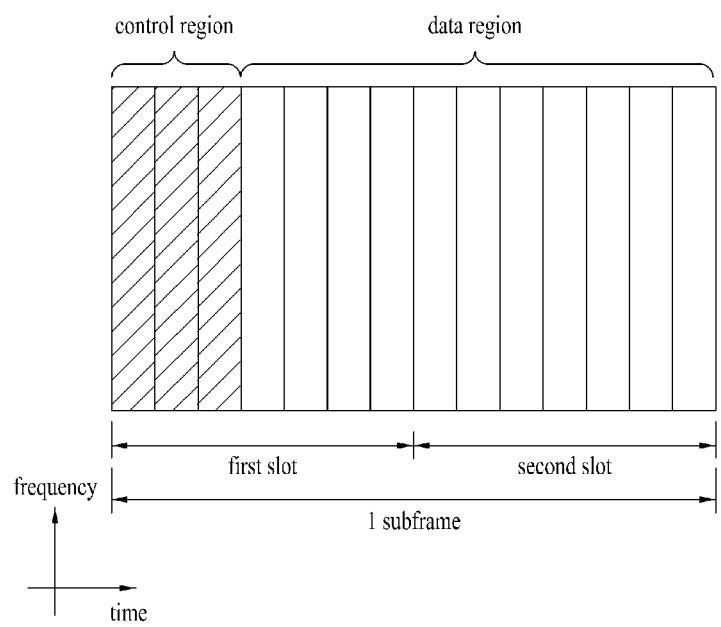
FIG. 4 is a diagram for a structure of a downlink subframe.

FIG. 4 is a diagram for a structure of a downlink (DL) subframe.

Referring to FIG. 4, maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like.

The PCFICH carried on a first OFDM symbol of a subframe carries the information on the number of OFDM symbols used for the transmission of control channels within the subframe. The PHICH carries HARQ ACK/NACK (hybrid automatic repeat request acknowledgement/negative acknowledgement) signal in response to an UL transmission. Control information carried on PDCCH may be called downlink control information (DCI: downlink control indicator). The DCI includes UL resource allocation information, DL resource allocation information or a UL transmit (Tx) power control command for a random UE group.

PDCCH is able to carry a transmission format and resource allocation information of DL-SCH (downlink shared channel), a transmission format and resource allocation information of UL-SCH (uplink shared channel), paging information on PCH (paging channel), system information on DL-SCH, resource allocation information of an upper layer control message such as a random access response transmitted on PDSCH, a transmit power control command set for individual user equipments within a user equipment (UE) group, a transmit power control command, activation indication information of VoIP (voice over IP) and the like. A plurality of PDCCHs can be transmitted in a control region and a user equipment is able to monitor a plurality of the PDCCHs. PDCCH is transmitted on an aggregation of a plurality of contiguous control channel elements (CCEs). CCE is a logical assignment unit used to provide PDCCH with a code rate in accordance with a state of a radio channel. CCE corresponds to a plurality of REGs (resource element groups). A format of PDCCH and the number of available bits of PDCCH are determined by a correlation between the number of the CCEs and the code rate provided by the CCEs.

A base station determines PDCCH format in accordance with DCI to transmit to a user equipment and attaches CRC (cyclic redundancy check) to control information. The CRC is masked with an identifier (called RNTI (radio network temporary identifier)) in accordance with an owner or usage of PDCCH. If the PDCCH is provided for a specific user equipment, the CRC can be masked with an identifier of the corresponding user equipment, i.e., C-RNTI (i.e., Cell-RNTI). As a different example, if the PDCCH is provided for a paging message, the CRC can be masked with a paging identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). If the PDCCH is provided for a random access response, the CRC can be masked with RA-RNTI (random access-RNTI).

Figure 5:
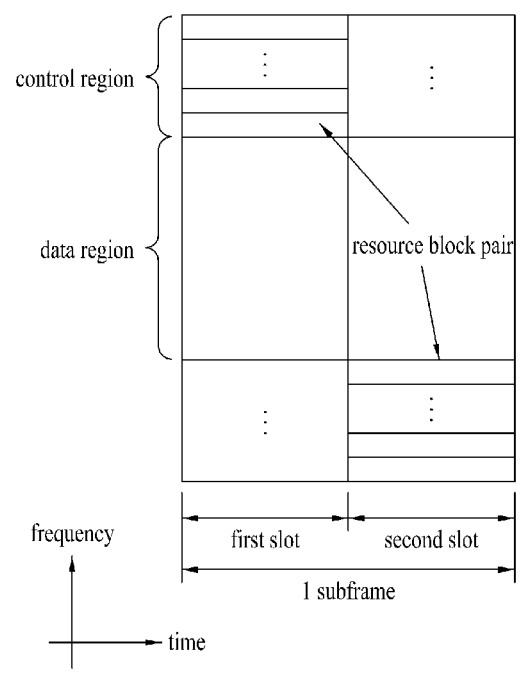
FIG. 5 is a diagram for a structure of an uplink subframe.

FIG. 5 is a diagram for a structure of an uplink (UL) subframe.

Referring to FIG. 5, a UL subframe may be divided into a control region and a data region in frequency domain. A physical UL control channel (PUCCH), which carries UL control information, is assigned to the control region. And, a physical UL shared channel (PUSCH), which carries user data, is assigned to the data region. In order to maintain single carrier property, one user equipment does not transmit PUCCH and PUSCH simultaneously. A resource block pair (RB pair) in subframe is allocated to PUCCH for one user equipment. Resource blocks belonging to the resource block (RB) pair may occupy different subcarriers in each of 2 slots. Namely, a resource block pair allocated to PUCCH is frequency-hopped on a slot boundary.

Method of Positioning a User Equipment

In the following, an OTDOA method is described in detail.

Figure 6:
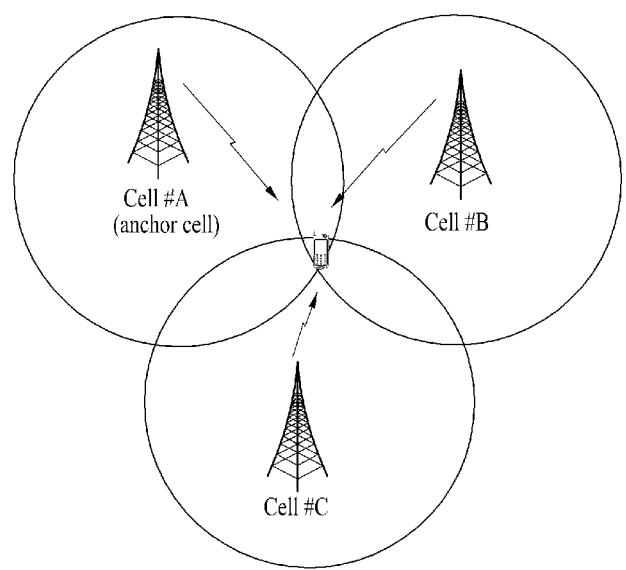
FIG. 6 is a diagram for an example of an OTDOA method for positioning of a user equipment.

FIG. 6 is a diagram for an example of an OTDOA method for positioning of a user equipment.

Referring to FIG. 6, since a user equipment performs a reference clock on the basis of a subframe transmitted from a current serving cell, signals received from a neighboring cell have TOAs different from each other.

As mentioned in the foregoing description, an OTDOA technique is used for measuring a location of a user equipment using timing difference between signals transmitted from each cell and arrived at the user equipment. A reference cell is a cell becoming a criterion of TDOA. Hence, it is able to measure time taken for receiving a signal from one reference cell and delayed time of signals received from each of a plurality of the neighboring cells using reference signals or synchronization signals received from a plurality of neighboring cells and may be then able to report them to a serving cell or an anchor cell. The serving cell measures a location of the corresponding user equipment using the reported delayed times. In this case, the reference cell indicates a cell capable of being a reference of the TDOA (time difference of arrival). If the serving cell corresponds to the reference cell or a user equipment performs such an operation as a handover and the like, the reference cell may not change irrespective of whether the serving cell before the handover operation corresponds to the reference cell or the handover operation of the user equipment and the like.

As a measurement signal measured for positioning a user equipment, a CRS (common reference signal) or a PSS/SSS (primary synchronization signal/secondary synchronization signal) can be used. Or, a dedicated PRS (positioning reference signal) for a LCS (location service) can also be used. In the following, for clarity, an example of a PRS is described as a measurement signal used for positioning a user equipment.

A simplest method of OTDOA-IPDL corresponds to a case that there is no idle period in DL. This can be called a simple OTDOA. A base station can provide a user equipment with an idle period in DL to enhance a listening capability of the user equipment used for listening to signals transmitted from neighboring cells.

In the following, a scenario of detecting a PRS from a user equipment in the OTDOA method is described with reference to FIG. 7.

Figure 7:
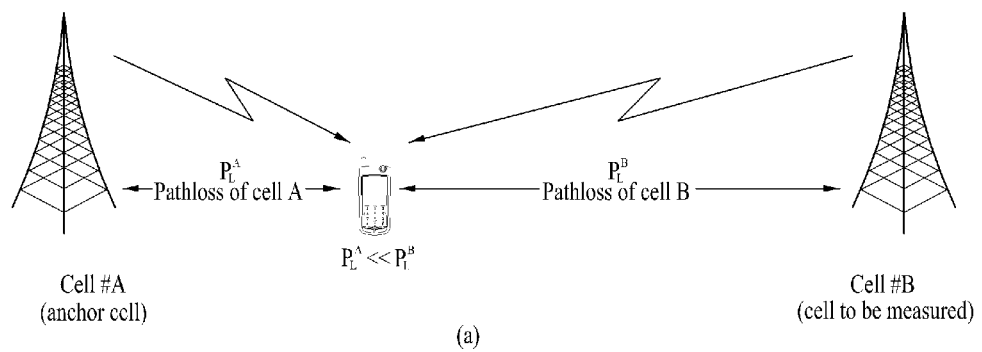
FIG. 7 is a diagram for an example of a detection scenario of a positioning reference signal (PRS) according to an OTDOA method.
Figure 7:
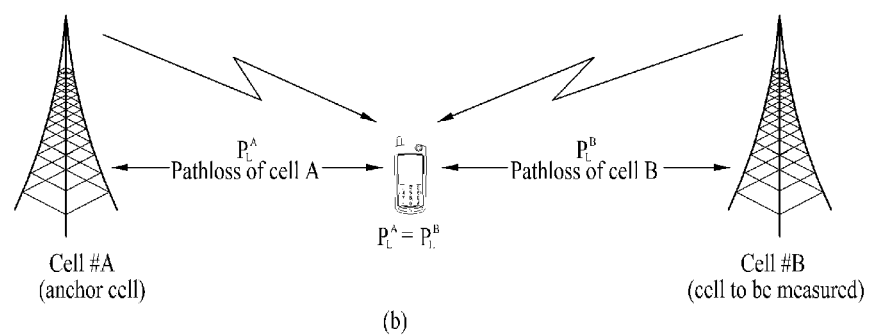

FIG. 7 is a diagram for an example of a detection scenario of a positioning reference signal (PRS) according to an OTDOA method.

In a situation that a user equipment is connected with a serving cell, if the user equipment receives PRSs transmitted from both the serving cell and a target cell, it is able to consider two cases as follow.

FIG. 7 (a) shows a first case. The first case shows that a pathloss of a PRS transmitted from a cell A corresponding to a serving cell (or anchor cell) is smaller than a pathloss of a PRS transmitted from a cell B corresponding to a target cell. FIG. 7 (b) shows a second case. The second case shows that the pathloss of the PRS transmitted from the serving cell (cell A) is similar to the pathloss of the PRS transmitted from the target cell (cell B).

Referring to FIG. 7 (b), since the pathloss of the PRS transmitted from the serving cell (cell A) and the pathloss of the PRS transmitted from the target cell (cell B) are similar to each other, the PRSs, which are transmitted from both cells using identical power, can be received by the user equipment using a similar amplitude, i.e., similar power. Having received the PRSs, the user equipment performs a signal amplification process so-called an AGC (automatic gain control) and amplifies the PRS received from the target cell (cell B) to make the PRS received from the target cell to be suitable for an operation range of an ADC (analog to digital converter). Subsequently, the user equipment can distinguish the PRS transmitted from the serving cell (cell A) from the PRS transmitted from the target cell (cell B) using an output of the ADC. In this case, if a signal received from the target cell (cell B) has a sufficient energy, the user equipment can detect the signal. As shown in FIG. 6, if the two PRSs are received with similar power, the user equipment can detect the PRS transmitted from the target cell (cell B) from the received PRSs without any special problem.

On the contrary, referring to FIG. 7 (a), since the pathloss between the target cell (cell B) and the user equipment is considerably large, the PRS received from the target cell (cell B) is measured as a very small signal compared to the PRS received from the serving cell (cell A). In this case, if the PRS received from the serving cell (cell A) is larger than the PRS received from the target cell (cell B), the total of the received PRS may be similar to the PRS received from the serving cell (cell A). Since the AGC amplifies a signal in consideration of the total signals received from both the target cell (cell B) and the serving cell (cell A), the PRS received from the target cell (cell B) may be disappeared within a quantization error range in the course of performing the ADC. In particular, it is highly likely that the user equipment is unable to detect the PRS transmitted from the target cell (cell B).

In order to solve the aforementioned problem, the serving cell (cell A) can configure an idle period or a signal non-transmitting duration. Since there is no impact of a signal transmitted from the serving cell (cell A) during the idle period of the serving cell (cell A), the PRS transmitted from the target cell (cell B) can be detected without an error after passing through the ADC process although the pathloss of the PRS transmitted from the target cell is large.

A method of preventing interference between signals, which occurs due to propagation delay of PRSs transmitted from each cell, is described with reference to FIG. 8 in the following.

Figure 8:
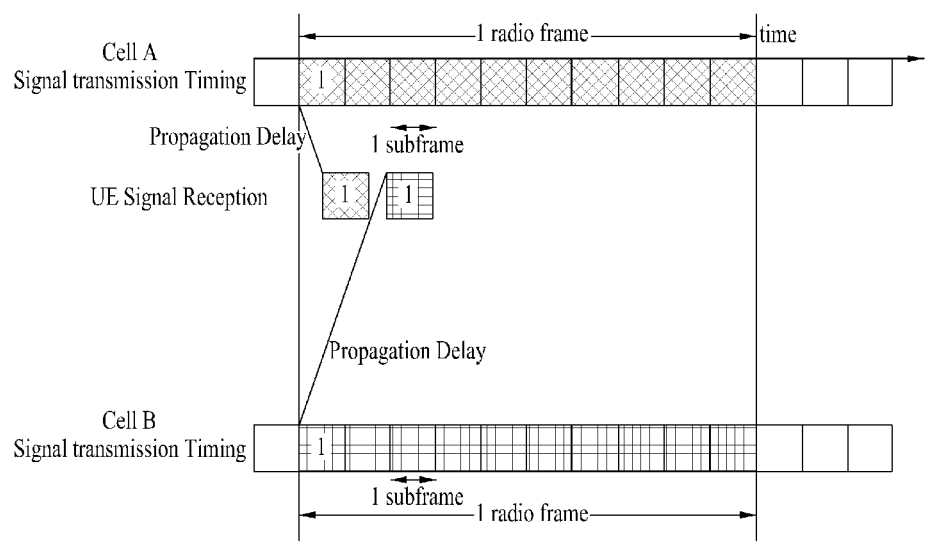
FIG. 8 is a diagram for an example of propagation delay of signals transmitted from a plurality of cells.

FIG. 8 is a diagram for an example of propagation delay of signals transmitted from a plurality of cells.

Referring to FIG. 8, although two PRSs are simultaneously transmitted from cells different from each other (cell A and cell B), reception timing of the two PRSs may be different from each other in a user equipment due to propagation delay of the PRSs. FIG. 8 shows an example of the aforementioned situation and assume that the user equipment is positioned at a location farther from a cell B compared to a cell A.

Irrespective of whether cells are synchronized or not, PRSs can be received from the cells different from each other on timing different from each other. In case of a system of a maximum cell radius of 100 km, maximum propagation delay capable of being occurred in a user equipment may correspond to about 100 [km]/300000 [km/s] (sec)=0.334 (micro sec).

In case of a non-synchronous system, if a length of a single subframe corresponds to 1 ms and measurement on a received PRS is performed in a subframe unit, maximum deviation capable of being occurred between PRSs received from two cells may become ±0.5 ms (or half subframe). This is because if subframe timing difference between two cells related to two reference subframes is greater than 0.5 ms, relative time difference of the reference subframes can be re-defined to be always less than or equal to ±0.5 ms.

Figure 9:
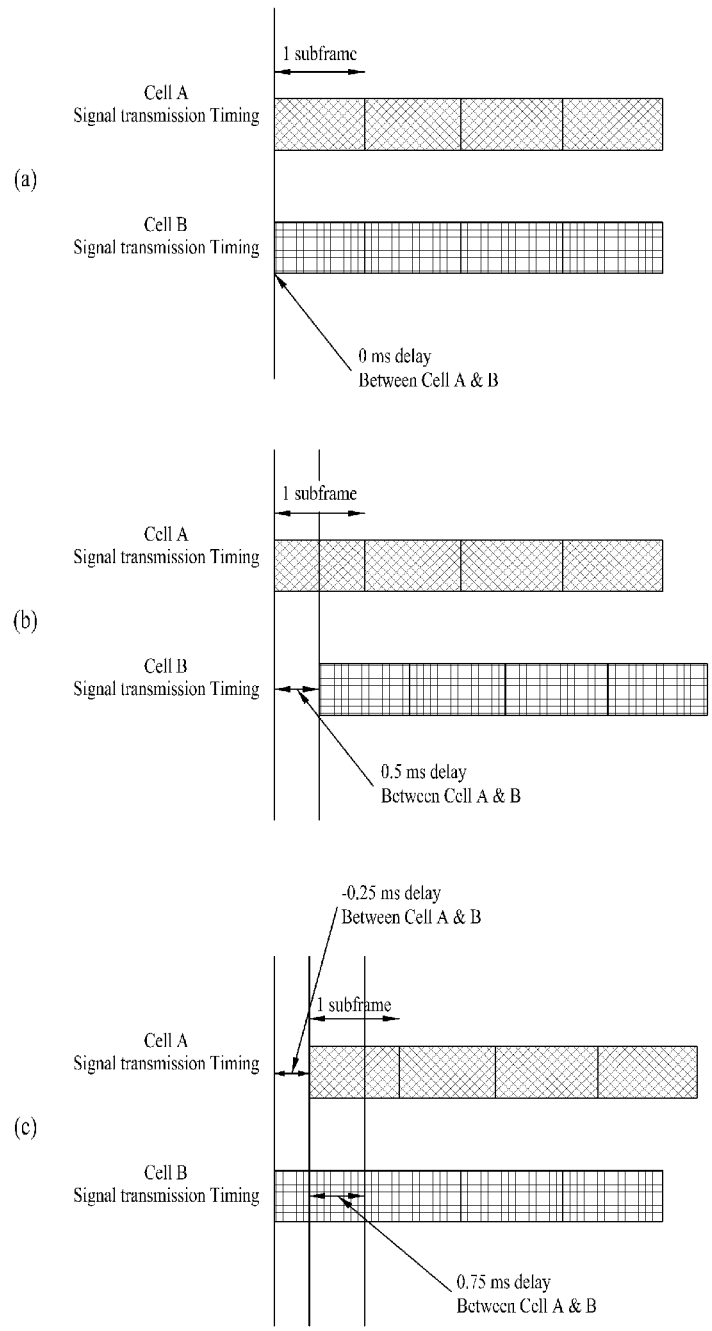
FIG. 9 is a diagram for explaining relative time difference between signals transmitted from two cells.

FIG. 9 is a diagram for explaining relative time difference between signals transmitted from two cells.

FIG. 9 (a) shows an example that a relative time difference between two cells corresponds to 0 ms. FIG. 9 (b) shows an example that a relative time difference between two cells corresponds to 0.5 ms. FIG. 9 (c) shows an example that a relative time difference between two cells corresponds to 0.75 ms (or −0.25 ms).

In order to receive a PRS from a specific target cell (e.g., a reference cell or a neighboring cell) without any interference from a serving cell, maximum 3 idle subframes are required. In particular, contiguous 1, 2 or 3 idle subframes can be configured according to PRS transmission timing of the target cell and idle subframe timing of the serving cell.

Figure 10:
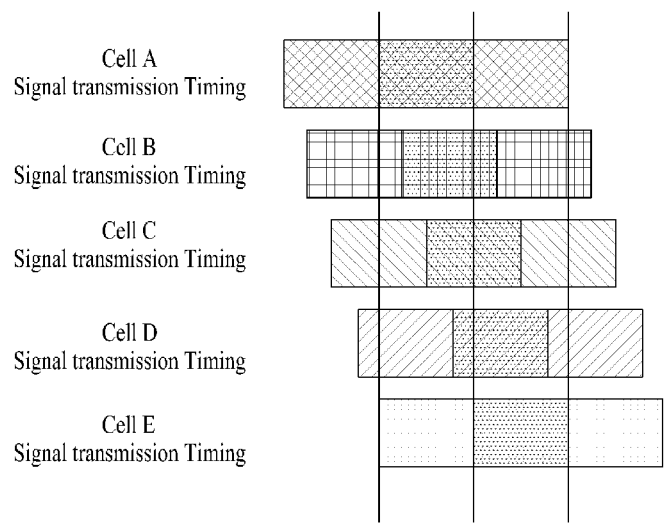
FIG. 10 is a diagram for a signal transmission timing of each base station.

FIG. 10 is a diagram for a signal transmission timing of each base station. In FIG. 10, assume that a user equipment is communicating in a manner of being connected with a cell C.

Referring to FIG. 10, as mentioned in the foregoing description, since maximum relative time difference, which is capable of being occurred between PRSs received from two cells, corresponds to a half of a subframe, in order to receive each of signals transmitted from all cells without inter-signal interference, it is able to know that 1 to 3 contiguous idle subframes should be configured.

As mentioned in the foregoing description, if the 1 to 3 contiguous idle subframes are configured, a user equipment measures reception delayed time of PRSs transmitted from each of the cells on the basis of a start point of a first idle subframe of a serving cell and may be then able to report the measured reception delayed time of the PRSs to the serving cell.

In order to make the user equipment measure without reading a radio frame boundary or a subframe boundary, the serving cell can inform the user equipment of a measurement subframe timing via a target cell ID together with a subframe number and a system frame number (SFN) of the serving cell. In addition, the serving cell can inform the user equipment of a PRS bandwidth and a frequency position of a PRS of the target cell. By doing so, the user equipment can blindly detect a PRS without any search procedure for the target cell or a synchronization procedure for the target cell.

Information necessary for measuring the target cell can be broadcasted by the serving cell. The information includes an actual target cell ID(s). This can be enabled because a network already knows accurate geographical locations of base stations. And, the serving cell can identify nearest cells around the serving cell with the help of the target cell ID(s). The serving cell can enhance measurement in a manner of eliminating such cells not affecting propagation delay of a signal as cells (e.g., 3 sectors within a base station) including a Tx antenna while coexisting with the serving cell.

In the following description, a positioning reference signal (hereinafter abbreviated PRS) is explained.

First of all, PRS is a reference signal used for positioning of a user equipment, is carried on resource blocks of a downlink (hereinafter abbreviated DL) subframe determined for PRS transmission only and is transmitted via an antenna port 6.

A PRS sequence is defined according to Formula 1 in the following.

$$r_{l,n_s}(m) = \frac{1}{\sqrt{2}}(1 - 2\cdot c(2m)) + j\frac{1}{\sqrt{2}}(1 - 2\cdot c(2m+1)), \quad \text{[Formula 1]}$$
$$m = 0, 1, \ldots, 2N_{RB}^{max,DL} - 1$$

In Formula 1, the $n_s$ indicates a slot number in a radio frame, the '1' indicates an OFDM symbol number in a slot and '$N_{RB}^{max,DL}$' indicates the number of resource block (RB) corresponding to maximum system bandwidth. The c(i) indicates a pseudo-random sequence and a pseudo-random sequence generator is initialized at a start point of each OFDM symbol as shown in Formula 2 in the following.

$$c_{init} = 2^{10}\cdot(7\cdot(n_s+1)+l+1)\cdot(2\cdot N_{ID}^{cell}+1)+2\cdot N_{ID}^{cell}+N_{CP} \quad \text{[Formula 2]}$$

In Formula 2, the $N_{ID}^{cell}$ is a physical layer cell ID. The $N_{CP}$ is set to 1 if an OFDM symbol has a normal cyclic prefix (CP). The $N_{CP}$ is set to 0 if an OFDM symbol has an extended cyclic prefix (CP).

A reference signal (i.e., PRS) sequence ($r_{l,n_s}(m)$) is a reference signal used for an antenna port 6 (p=6) in a slot ($n_s$) configured to transmit a reference signal. The reference signal sequence can be mapped to complex-valued modulation symbols ($a_{k,l}^{(p)}$) according to Formula 3 in the following.

$$a_{k,l}^{(p)} = r_{l,n_s}(m') \quad \text{[Formula 3]}$$

In Formula 3, a resource index pair (k, l) used for reference signal transmission, m and m' value can be determined according to Formula 4 and 5 in the following. In this case, Formula 4 indicates a normal cyclic prefix case and Formula 5 indicates an extended cyclic prefix case.

[Formula 4]

$$k = 6(m + N_{RB}^{DL} - N_{RB}^{PRS}) + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and (1 or 2 } PBCH \text{ antenna ports)} \\ 2, 3, 5, 6 & \text{if } n_s \bmod 2 = 1 \text{ and (4 } PBCH \text{ antenna ports)} \end{cases}$$

$$m = 0, 1, \ldots, 2 \cdot N_{RB}^{PRS} - 1$$

$$m' = m + N_{RB}^{max,DL} - N_{RB}^{PRS}$$

[Formula 5]

$$k = 6(m + N_{RB}^{DL} - N_{RB}^{PRS}) + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and (1 or 2 } PBCH \text{ antenna ports)} \\ 2, 4, 5 & \text{if } n_s \bmod 2 = 1 \text{ and (4 } PBCH \text{ antenna ports)} \end{cases}$$

$$m = 0, 1, \ldots, 2 \cdot N_{RB}^{PRS} - 1$$

$$m' = m + N_{RB}^{max,DL} - N_{RB}^{PRS}$$

In this case, reference signal bandwidth and the number of resource block ($N_{RB}^{PRS}$) can be configured by an upper layer. And, a reference signal has a frequency shift value ($v_{shift}$) different from each other according to each cell and a cell-specific frequency shift can be determined according to Formula 6 in the following.

$$v_{shift} = N_{ID}^{cell} \bmod 6 \quad \text{[Formula 6]}$$

Figure 11:
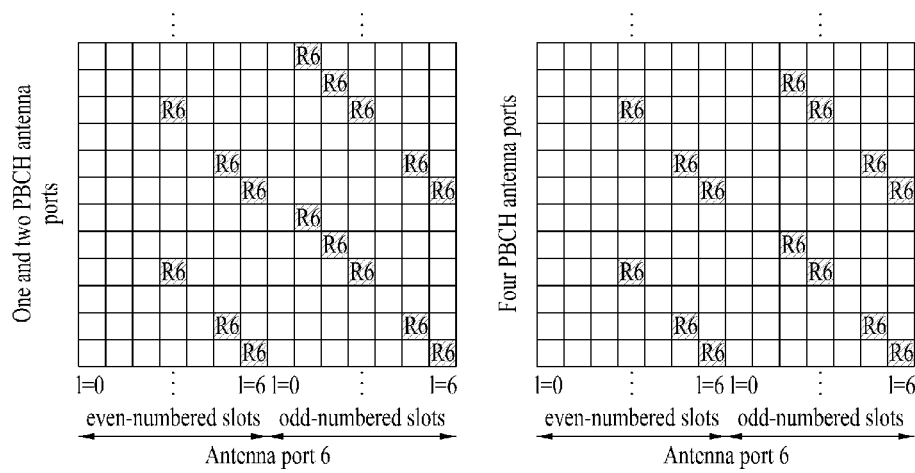
FIG. 11 is a diagram for patterns of PRS allocated to a resource block.
Figure 11:
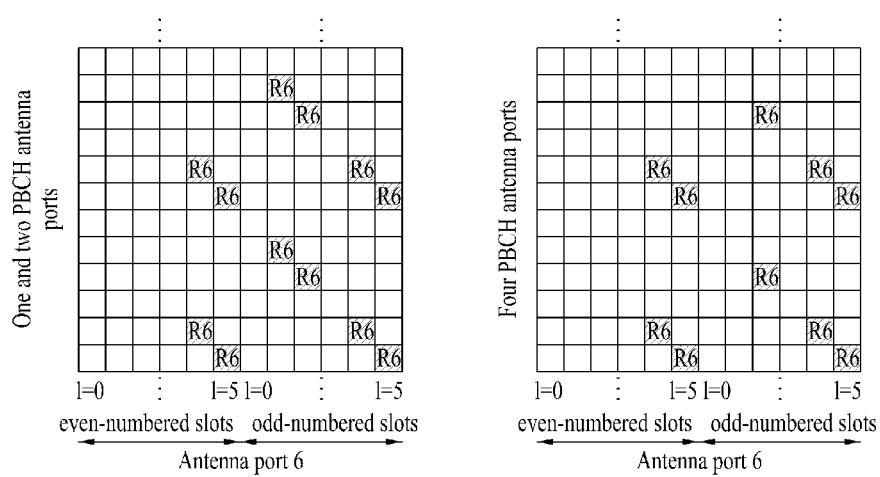

If a preamble signal is mapped to a radio resource using the aforementioned method, a preamble structure transmitted in a specific subframe is shown in FIG. 11.

FIG. 11 is a diagram for patterns of PRS allocated to a resource block. FIG. 11 (*a*) shows a case of normal CP. FIG. 1 (*b*) shows a case of extended CP.

In the following description, a method of determining a position of a user equipment via OTDOA method is described in detail.

As mentioned in the foregoing description, in order to measure a position of a user equipment using an OTDOA method, the user equipment should calculate timing difference between signals transmitted from each cell and arrive at the user equipment. In particular, the user equipment calculates PRS time difference (hereinafter named RSTD) between a reference cell and one or more neighbor cells and transmits the RSTD to a serving base station. In this case, the serving base station can inform the user equipment of information on the reference cell and information on the neighbor cells. Assistance data provided by the serving base station can include the information on the reference cell and/or the information on the one or more neighbor cells necessary for the user equipment to calculate the RSTD. In particular, the user equipment receives PRSs from the reference cell and the neighbor cells using the assistance data received from the serving base station, calculates the RSTD between the reference cell and the neighbor cells and transmits the RSTD to the serving base station. Subsequently, the serving base station transmits the RSTD to a location server and the location server determines a position of the user equipment using the RSTD.

Figure 12:
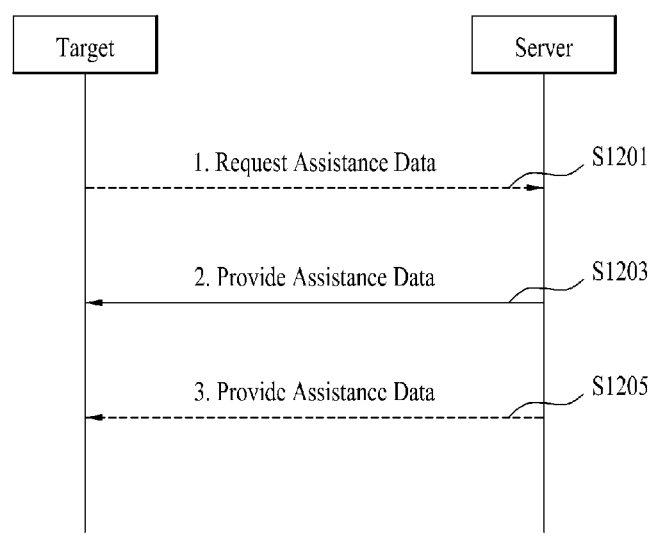
FIG. 12 is a flowchart for an example of a process of delivering an assistance data.

FIG. 12 is a flowchart for an example of a process of delivering an assistance data.

Referring to FIG. 12, a target device (i.e., user equipment) transmits an assistance data request message (RequestAssistanceData message) to a location server via a base station [S1201]. The location server transmits an assistance data provision message (ProvideAssistanceData message) including assistance data to the user equipment in response to the assistance data request message [S1203]. In this case, the transmitted assistance data should be matched with the assistance data requested by the user equipment in the step S1201 or be a subset. The location server may transmit information, which is determined as helpful for the user equipment, to the user equipment together with the assistance data although the user equipment does not request the location server to transmit the information. If the step S1205 is not performed, a message of the step S1003 may include an end transaction information element (endTransaction IE) (set to 'True') indicating that the message is the last message.

The location server can transmit an additional assistance data provision message including an additional assistance data to the user equipment [S1205]. In this case, the transmitted assistance data should be matched with the assistance data requested by the user equipment in the step S1201 or be a subset. The location server may transmit information, which is determined as helpful for the user equipment, to the user equipment together with the assistance data although the user equipment does not request the location server to transmit the information. A last message may include an end transaction information element (endTransaction IE) (set to 'True') indicating that the message is the last message.

In the meantime, the location server can transmit an unsolicited assistance data to the user equipment. In this case, the step S1201 of receiving the assistance data request message from the user equipment may be omitted.

The target device (user equipment) and the location server can transceive location information with each other. Regarding this, it shall be described with reference to FIG. 13 in the following.

Figure 13:
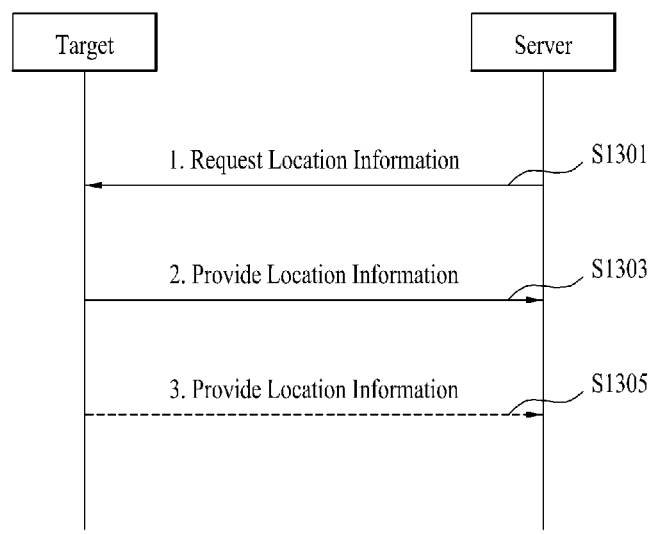
FIG. 13 is a flowchart for an example of a process of transmitting location information.

FIG. 13 is a flowchart for an example of a process of transmitting location information.

Referring to FIG. 13, a location server transmits a location information request (RequestLocationInformation) message to a user equipment to request location information [S1301]. In this case, the location server can indicate a necessary location information type or an additional auxiliary QoS.

Having received the location information request message from the location server, the user equipment transmits a location information provision (ProvidedLocationInformation) message to the location server to transmit location information [S1303]. In this case, the transmitted location information should be matched with the location information requested by the location server in the step S1301 or be a subset unless the server explicitly permits additional location information. A lastly transmitted location information provision message includes an end transaction indicator indicating that the message corresponds to the last message.

If there exists a request of the location server in the step S1301, the user equipment transmits an additional location information provision (ProvidedLocationInformation) message to the location server to transmit location information. In this case, similar to the aforementioned description, the transmitted location information should be matched with the location information requested by the location server in the step S1301 or be a subset unless the server explicitly permits additional location information. A lastly transmitted location information provision message includes an end transaction indicator indicating that the message corresponds to the last message.

In the following description, assistance data received by the user equipment is described in more detail.

Table 1 shows OTDOA assistance data included in an assistance data provision message.

TABLE 1

```
-- ASN1START
OTDOA-ProvideAssistanceData ::= SEQUENCE {
    otdoa-ReferenceCellInfo    OTDOA-ReferenceCellInfo       OPTIONAL,  -- Need ON
    otdoa-NeighbourCellInfo    OTDOA-NeighbourCellInfoList   OPTIONAL,  -- Need ON
    otdoa-Error                OTDOA-Error                   OPTIONAL,  -- Need ON
    ...
}
-- ASN1STOP
```

Referring to Table 1, the OTDOA assistance data includes OTDOA reference cell information (otdoa-ReferenceCellInfo) and OTDOA neighbor cell information (otdoa-NeighbourCellInfo). The OTDOA neighbor cell information (otdoa-NeighbourCellInfo) includes an OTDOA neighbor cell information list (OTDOA-NeighbourCellInfoList) field.

First of all, the OTDOA reference cell information (otdoa-ReferenceCellInfo) included in the OTDOA assistance data is explained.

Table 2 shows the OTDOA reference cell information.

TABLE 2

```
-- ASN1START
OTDOA-ReferenceCellInfo ::= SEQUENCE {
    physCellId          INTEGER (0..503),
    cellGlobalId        ECGI                              OPTIONAL,  -- Need ON
    earfcnRef           ARFCN-ValueEUTRA    OPTIONAL,                -- Cond NotSameAsServ0
    antennaPortConfig   ENUMERATED {ports1-or-2, ports4, ... }
                                                          OPTIONAL,  -- Cond NotSameAsServ1
    cpLength            ENUMERATED { normal, extended, ... },
    prsInfo             PRS-Info            OPTIONAL,                -- Cond PRS
    ...
}
-- ASN1STOP
```

Referring to Table 2, the OTDOA reference cell information includes a physical cell ID (physCellId), antenna port configuration (antennaPortConfig), cyclic prefix length (cpLength) and PRS information (prsInfo).

The physCellId indicates a physical cell ID of a reference cell and the antennaPortConfig indicates whether a reference cell uses at least one antenna port or 4 antenna ports for a cell-specific reference signal. The cpLength indicates CP length information used for transmitting PRS in a reference cell. Among the information included in the OTDOA reference cell information, the prsInfo is explained in more detail with reference to Table 3 in the following.

Table 3 is a table showing prsInfo.

As shown in Table 3, the prsInfo includes PRS bandwidth (prs-Bandwidth), a PRS configuration index (prs-ConfigurationIndex), the number of DL frame (numDL-Frames) and PRS muting information (prs-MutingInfo).

The prs-Bandwidth indicates a bandwidth used for configuring PRS, the prs-ConfigurationIndex indicates information on timing of transmitting PRS and the numDL-Frames indicates the number (Nprs) of contiguous DL subframes to which PRS is allocated.

The prs-MutingInfo indicates PRS muting configuration of a corresponding cell. The PRS muting configuration is defined by a periodic PRS muting sequence including a TPRS period. The TPRS is represented by the number of PRS positioning occasions. The positioning occasions include Nprs number of DL subframes. The PRS muting information can be defined on the basis of a system frame number (SFN) of a serving cell or a reference cell. If the PRS muting information is defined on the basis of the SFN of the serving cell, a first bit of a PRS muting sequence corresponds to a first positioning occasion starting after a start point of a frame where the SFN of the serving cell is 0. If the PRS muting information is defined on the basis of the SFN of the reference cell, the first bit of the PRS muting

TABLE 3

```
-- ASN1START
PRS-Info ::= SEQUENCE {
    prs-Bandwidth         ENUMERATED { n6, n15, n25, n50, n75, n100, ... },
    prs-ConfigurationIndex INTEGER (0..4095),
    numDL-Frames          ENUMERATED {sf-1, sf-2, sf-4, sf-6, ...},
    ...,
    prs-MutingInfo-r9     CHOICE {
        po2-r9                BIT STRING (SIZE(2)),
        po4-r9                BIT STRING (SIZE(4)),
        po8-r9                BIT STRING (SIZE(8)),
        po16-r9               BIT STRING (SIZE(16)),
        ...
    }                                         OPTIONAL    -- Need OP
}
-- ASN1STOP
``` sequence corresponds to the first positioning occasion starting after the start point of the frame where the SFN of the serving cell is 0.

In the following description, OTDOA neighbor cell information (otdoa-NeighbourCellInfo) included in the OTDOA assistance data is explained.

Table 4 shows OTDOA neighbor cell information.

OTDOA neighbor cell information element of a neighbor cell including highest priority for the RSTD measurement of the user equipment.

Each of a plurality of the OTDOA neighbor cell information elements can include a physical cell identifier (physCellId), a cell global identifier (cellGlobalId), an E-UTRA absolute radio frequency channel number (earfcn), a cyclic

TABLE 4

```
-- ASN1START
OTDOA-NeighbourCellInfoList ::= SEQUENCE (SIZE (1..maxFreqLayers)) OF OTDOA-NeighbourFreqInfo
OTDOA-NeighbourFreqInfo ::= SEQUENCE (SIZE (1..24)) OF OTDOA-NeighbourCellInfoElement
OTDOA-NeighbourCellInfoElement ::= SEQUENCE {
    physCellId              INTEGER (0..503),
    cellGlobalId            ECGI                    OPTIONAL,    -- Need ON
    earfcn                  ARFCN-ValueEUTRA        OPTIONAL,    -- Cond NotSameasRef0
    cpLength                ENUMERATED {normal, extended, ...}
                                                    OPTIONAL,    -- Cond NotSameasRef1
    prsInfo                 PRS-Info                OPTIONAL,    -- Cond NotSameasRef2
    antennaPortConfig       ENUMERATED {ports-1-or-2, ports-4, ...}
                                                    OPTIONAL,    -- Cond NotSameasRef3
    slotNumberOffset        INTEGER (0..19)         OPTIONAL,    -- Cond NotSameasRef4
    prs-SubframeOffset      INTEGER (0..1279)       OPTIONAL,    -- Cond InterFreq
    expectedRSTD            INTEGER (0..16383),
    expectedRSTD-Uncertainty INTEGER (0..1023),
    ...
}
maxFreqLayers   INTEGER ::= 3
-- ASN1STOP
```

As shown in Table 4, OTDOA neighbor cell information includes at least one OTDOA neighbor cell information element (OTDOA-NeighbourCellInfoElement) and a plurality of OTDOA neighbor cell information elements included in the OTDOA neighbor cell information can be arranged in a descending order according to priority of a neighbor cell for RSTD measurement of a user equipment. In particular, a first OTDOA neighbor cell information element included in the OTDOA neighbor cell information may correspond to an prefix length (coLength), PRS information (prsInfo), an antenna port configuration (antennaPortConfig), a slot number offset (slotNumberOffset), a PRS subframe offset (prs-SubframeOffset), an RSTD expectation value (expectedRSTD) and uncertainty of an RSTD expectation value (expectedRSTD-Uncertainty).

Table 5 shows a condition (conditional presence) for whether each of the fields shown in Table 4 exists in the aforementioned neighbor cell information element.

TABLE 5

| Conditional presence | description |
|---|---|
| NotsameAsRef0 | If an absolute radio frequency channel number is not identical to an absolute radio frequency channel number of a reference cell, an earfcn field mandatorily exists. Otherwise, the earfcn filed does not exist. The absolute radio frequency channel number indicates a carrier frequency value of a cell. |
| NotsameAsRef1 | If a cyclic prefix length is not identical to a cyclic prefix length of a reference cell, a cpLength field mandatorily exists. Otherwise, the cpLength field does not exist. |
| NotsameAsRef2 | If PRS configuration is not identical to PRS configuration of a reference cell, a prsInfo field mandatorily exists. Otherwise the prsInfo field does not exist. |
| NotsameAsRef3 | If antenna port configuration is not identical to antenna port configuration of a reference cell, an antennaPortConfig mandatorily exists. Otherwise, the antennaPortConfig field does not exist. |
| NotsameAsRef4 | If slot timing is not identical to slot timing of a reference cell, a slotNumberOffset field mandatorily exists. Otherwise, the slotNumberOffset field does not exist. |
| InterFreq | If ARFCN is not identical to ARFCN of a reference cell, a prs-SuframeOffset field optionally exists. Otherwise, the prs-SuframeOffset field does not exist. |

Table 6 shows explanation on OTDOA neighbor cell information list (OTDOA-NeighbourCellInfoList) field.

TABLE 6

Explanation on OTDOA neighbor cell information list (OTDOA-NeighbourCellInfoList) field

--- physCellId

This field indicates a physical cell identifier of a neighbor cell.

cellGlobalId

This field indicates an ECGI (evolved cell global identifier) of a neighbor cell. The ECGI indicates a cell global identifier of a cell within E-UTRA. If it is difficult to specify a cell by the physCellId field, a server provides this field.

Earfcn

This field indicates an ARFCN (absolute radio frequency channel number) of a neighbor cell.

cpLength

This field indicates a cyclic prefix length of a neighbor cell.

prsInfo

This field indicates PRS configuration of a neighbor cell. This field has a form identical to the prsInfo included in OTDOA reference cell information shown in Table 3.

antennaPortConfig

This field indicates antenna port configuration indicating whether an antenna port used for a cell-specific reference signal in a neighbor cell corresponds to 1, 2 or 4.

slotNumberOffset

This field indicates slot number offset between a neighbor cell and a reference cell. The slot number offset is represented by the total number of slots counted from a start point of a radio frame of the reference cell to a start point of a radio frame of a next nearest neighbor cell.

Prs-SubframeOffset

This field indicates offset between a first PRS subframe of a reference cell on a reference carrier frequency layer and a first PRS subframe of PRS burst of a different cell on a next nearest different carrier frequency layer. A value of this field is given by the total number of subframes. If ARFCN is not identical to a reference cell, this field does not exist. In this case, a receiving end considers PRS subframe offset of a corresponding cell as 0.

expectedRSTD

This field indicates an expected RSTD value in case that a target device (user equipment) measures a reference cell and a neighbor cell included in the OTDOA reference cell information (OTDOAReferenceCellInfo). An RSTD value may have a negative value and can be calculated by (expectedRSTD - 81923). A resolution (or scale factor) corresponds to 3 * Ts (Ts = 1/15000 * 2048) sec).

expectedRSTD-Uncertainty

This field indicates uncertainty of an expectedRSTD value, in particular, an error range of the expectedRSTD value. The uncertainty of the expectedRSTD value relates to a priori estimation for a target device (user equipment) estimated by a location server. The expectedRSTD-Uncertainty defines a search window for the target device as shown in Formula 7 in the following. In this case, a resolution (or scale factor) of the expectedRSTD-Uncertainty corresponds to 3 * Ts (Ts = 1/15000 * 2048) sec).

[expectedRSTD−expectedRSTD-Uncertainty]<measured RSTD<[expectedRSTD+expectedRSTD-Uncertainty]  [Formula 7]

In the following description, a method of determining PRS subframe configuration (i.e., PRS transmission period) according to a PRS configuration index included in prsInfo is explained.

Table 7 shows PRS subframe configuration.

TABLE 7

| PRS configuration Index $I_{PRS}$ | PRS periodicity $T_{PRS}$ (subframes) | PRS subframe offset $\Delta_{PRS}$ (subframes) |
|---|---|---|
| [0-159] | [160] | [$I_{PRS}$] |
| [160-479] | [320] | [$I_{PRS}$-160] |
| [480-1119] | [640] | [$I_{PRS}$-480] |
| [1120-2399] | [1280] | [$I_{PRS}$-1120] |
| [2400-4095] | [Reserved] | |

Referring to Table 7, a cell-specific subframe configuration period ($T_{PRS}$) and a cell-specific subframe offset ($\Delta_{PRS}$) are determined according to a PRS configuration index ($I_{PRS}$). The PRS configuration index ($I_{PRS}$) is configured by an upper layer. PRS is transmitted in a configured DL subframe only and is not transmitted in a special subframe. And, PRS is transmitted in $N_{PRS}$ numbers of contiguous DL subframes and $N_{PRS}$ is configured by an upper layer. A first subframe among the $N_{PRS}$ numbers of subframes in which PRS is transmitted is determined by Formula 8 in the following.

$(10 \times n_f + \lfloor n_s/2 \rfloor - \Delta_{PRS}) \bmod T_{PRS} = 0$  [Formula 8]

In Formula 8, the $n_f$ indicates an SFN and the $n_s$ indicates a slot number. In particular, if a user equipment receives an assistance data providing message, it can be aware of each PRS information using a PRS configuration index of at least one reference cell contained in the assistance data providing message.

In the following description, in order for a user equipment to receive a signal from a base station and perform measurement, a method of configuring a measurement section $T_{RSTD}$ for RSTD using a PRS transmission period is explained.

If physical layer cell IDs of neighbor cells are provided together with OTDOA assistance data, a user equipment can detect and measure intra-frequency RSTD for at least 16 cells (n=16) including a reference cell on a carrier frequency identical to a frequency of the reference cell within $T_{RSTD}$ (ms) given by Formula 9 in the following.

$T_{RSTD} = T_{PRS} \cdot (M-1) + \Delta$ ms  [Formula 9]

In Formula 9, $T_{RSTD}$ indicates total time required to detect and measure at least n number of cells. As mentioned in the foregoing description, $T_{PRS}$ indicates a cell-specific positioning subframe configuration period. M indicates the number of PRS positioning occasions defined by Table 8 in the following. Each of the PRS positioning occasions includes contiguous $N_{PRS}$ ($1 \leq N_{PRS} \leq 6$) number of subframes. $\Delta$ includes sampling time and processing time as measurement time for one PRS positioning occasion and it can be represented as $$160 \cdot \lceil \frac{n}{M} \rceil \text{ (ms)}.$$

Table 8 shows the number of positioning occasions within $T_{RSTD}$.

TABLE 8

| Positioning subframe configuration period $T_{PRS}$ | Number of PRS positioning occasions M | |
|---|---|---|
| | f1 (intra-frequency) | f1 and f2 (inter-frequency) |
| 160 ms | 16 | 32 |
| >160 ms | 8 | 16 |

If following conditions are satisfied, a physical layer of a user equipment can report RSTD to a reference cell and all neighbor cells except at least (n−1) number of neighbor cells within $T_{RSTD}$.

All bands for a reference cell, $(PRS\hat{E}_s/Iot)_{ref} \geq -6$ dB

All bands for a neighbor cell, $(PRS\hat{E}_s/Iot)_i \geq 13$ dB

In this case, the conditions $(PRS\hat{E}_s/Iot)_{ref}$ and $(PRS\hat{E}_s/Iot)_i$ are applied to all subframes of at least $$L = \frac{M}{2}$$

number of PRS positioning occasions.

In case of a band 1, 4, 6, 10, 11, 18, 19 and 21, PRB 1, 2|dbm≥−127 dBm

In case of a band 9, PRB 1, 2|dbm≥−126 dBm

In case of a band 2, 5, and 7, PRB 1, 2|dbm≥−125 dBm

In case of a band 3, 8, 12, 13, 14, 17 and 20, PRB 1, 2|dbm≥−124 dBm

In the above-mentioned conditions, $PRS\hat{E}_s/Iot$ is defined by a PRS average receiving energy per resource element (RE) in a valid part of a symbol (e.g., except a cyclic prefix) and average reception power spectral density to total noise and interference ratio in the resource element. In this case, the ratio is measured for all resource elements carrying the PRS. And, PRP indicates a (linear) average power received by an antenna connector of a user equipment in a resource element in which E-UTRA PRS is transmitted.

Figure 14:
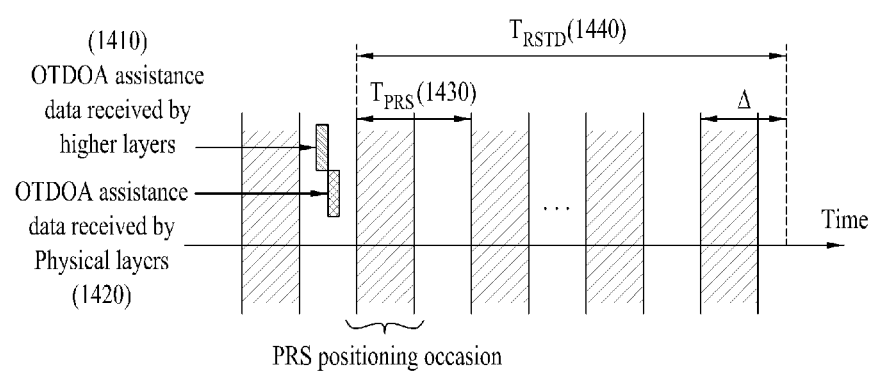
FIG. 14 is a flowchart for an example of a requirement for RSTD report time in a FDD system.

FIG. 14 is a flowchart for an example of a requirement for RSTD report time in a FDD system.

Referring to FIG. 14, if assistance data is received by higher layers of a user equipment [S1410], the assistance data is delivered to physical layers of the user equipment [S1420]. $T_{PRS}$ is determined according to indication of the assistance data [S1430] and $T_{RSTD}$ is determined according to the determined $T_{PRS}$ [S1440]. In this case, the $T_{RSTD}$ starts from a first subframe of a PRS positioning occasion, which is closest to timing of receiving the OTDOA assistance data via a location information provision (ProvidedLocationInformation) message. The user equipment measures PRSs received from each cell on the basis of each $T_{RSTD}$, calculates TOA and reports RSTD value to a location server via a base station.

Meanwhile, RSDT measurement accuracy for all neighbor cells (i) measured by the user equipment should satisfy following requirements. In the following description on the requirements, assume that a measurement report is not delayed using a different LPP (LTE positioning protocol) signaling via a DCCH (dedicated control channel).

According to an RSTD measurement reporting delay, in case of inserting a measurement report into TTI of UL DCCH, occurring delay uncertainty is not considered. In this case, the delay uncertainty corresponds to $2 \ast TTI_{DCCH}$. And, the measurement reporting delay does not include any delay, which may occur due to the shortage of a UL resource when the user equipment transmits a measurement report.

RSTD means relative timing difference between a relative cell and a neighbor cell and is defined as Table 9 in the following.

Table 9 is a table for explaining RSTD (reference signal time difference).

TABLE 9

| | |
|---|---|
| Definition | RSTD means relative time difference between a cell j (e.g., neighbor cell) and a cell i (e.g., reference cell) defined by TSubframeRxj-TsubframeRxi. In this case, the |

3GPP LTE/LTE-A system defines minimum requirements for RSTD measurement accuracy of a user equipment. The RSTD measurement accuracy is defined in a manner of being divided into a case of intra-frequency and a case of inter-frequency.

First of all, intra-frequency is explained. As shown in Table 10 (release-9) and Table 11 (release-10) in the following, RSTD measurement accuracy according to minimum PRS transmission frequency bandwidth of a target neighbor cell and a reference cell, which should be reported to support positioning of a user equipment on intra-frequency, is defined.

Table 10 shows an example of intra-frequency RSTD measurement accuracy in 3GPP LTE system (release-9) not supporting CA.

TABLE 10

| Parameter | Minimum bandwidth between the serving cell channel BW, the reference cell and the measured neighbour cell PRS BW [RB] | Minimum number of available measurement subframes between the reference cell and the measured neighbour cell | Unit | Accuracy [Ts] | Conditions Bands 1, 4, 6, 10, 11, 18, 19, 21, 33, 34, 35, 36, 37, 38, 39 and 40 Io | Bands 2, 5, 7 Io | Bands 3, 8, 12, 13, 14, 17, 20 Io | Band 9 Io |
|---|---|---|---|---|---|---|---|---|
| RSTD for (PRS Ês/Iot)$_{ref}$ ≥ −6 dB and (PRS Ês/Iot)$_i$ ≥ −13 dB | ≥6 ≥25 ≥50 | 6 ≥2 ≥1 | $T_s$ | ±15 ±6 ±5 | −121 dBm/ 15 kHz ... −50 dBm/ BW$_{Channel}$ | −119 dBm/ 15 kHz ... −50 dBm/ BW$_{Channel}$ | −118 dBm/ 15 kHz ... −50 dBm/ BW$_{Channel}$ | −120 dBm/ 15 kHz ... −50 dBm/ BW$_{Channel}$ |

Note 1:
Io is assumed to have constant EPRE across the bandwidth.
Note 2:
Ts is the basic timing unit defined in 3GPP TS 36.211 [16].
Note 3:
Reference cell and neighbour's PRS bandwidths are as indicated in prs-Bandwidth in the OTDOA assistance data defined in [24].

TABLE 9-continued

| | |
|---|---|
| | TSubframeRxj is time of receiving a start point of a subframe received by a user equipment from the cell j and the TsubframeRxi is time of receiving a start point of a subframe, which is closest to the subframe received by the user equipment from the cell j, from the reference cell i. |
| Application | RRC_CONNECTED intra-frequency RRC_CONNECTED inter-frequency |

A reference cell and neighbor cells may transmit PRSs on similar timing. If the reference cell and the neighbor cells transmit PRSs on similar timing, difference between timing of receiving PRS received by a user equipment from the reference cell and timing of receiving PRSs from each of a plurality of neighbor cells may be within a prescribed time range. For instance, the difference between timing of receiving PRS received by the user equipment from the reference cell and timing of receiving PRSs from each of a plurality of the neighbor cells may be within a subframe. Then, according to the definition of RSTD, if a subframe received by the user equipment from a neighbor cell j corresponds to a first subframe of PRS positioning occasions of the neighbor cell j, a subframe received from a cell i, which is a closest to the subframe received from the cell j, becomes a first subframe of PRS positioning occasions of the reference cell i. In this case, the PRS positioning occasions indicate contiguous DL subframes to which PRSs are allocated. Hence, RSTD becomes difference between the time of receiving PRS from the neighbor cell j and the time of receiving PRS from the reference cell i.

RSTD accuracy requirements defined by Table 10 can be applied irrespective of DRX (discontinuous reception) and may be valid under an assumption that following conditions are satisfied.

In case of a band 1, 4, 6, 10, 11, 18, 19, 21, 33, 34, 35, 36, 37, 38, 39 and 40, PRP 1, 2|dBm≥−127 dBm In case of a band 9, PRP 1, 2|dBm≥−126 dBm In case of a band 2, 5 and 7, PRP 1, 2|dBm≥−125 dBm In case of a band 3, 8, 12, 13, 14, 17 and 20, PRP 1, 2|dBm≥−124 dBm There is no overlapped measurement gap in a PRS subframe of a measured cell expectedRSTDUncertainty parameter, which is signaled from E-SMLC (enhanced-serving mobile location center) via LPP protocol, is less than 5 μs.

A LTE-A system supports a multicarrier or CA (carrier aggregation) system that uses at least one component carrier (CC) having a bandwidth smaller than a target band by aggregation in configuring a target broadband to support a broadband. According to the present invention, multicarrier means aggregation of carriers (or carrier aggregation). In this case, the carrier aggregation means aggregation of non-contiguous carriers as well as aggregation of contiguous carriers.

LTE-A system uses the concept of a cell to manage radio resources. The above-mentioned carrier aggregation environment may be called a multi-cell environment (environment of multiple cells). A cell is defined as a combination of a pair of a DL resource (DL CC) and a UL resource (UL CC). Yet, the UL resource is not a mandatory element. Hence, the cell may be configured with a DL resource only or both a DL resource and a UL resource. In case that a specific user equipment has one configured serving cell only, it may have one DL CC and one UL CC. Yet, in case that a specific user equipment has at least two configured serving cells, the number of DL CCs is equal to the number of the cells but the number of UL CCs may be equal to or smaller than the number of the cells. Alternatively, DL CCs and UL CCs may be configured to the contrary. In particular, in case that a specific user equipment has a plurality of configured serving cells, it may be able to support a carrier aggregation environment in which the number of UL CCs is greater than that of DL CCs. In more particular, carrier aggregation may be understood as aggregation of at least two cells differing from aforementioned intra-frequency RSTD accuracy requirement (refer to following Table 11). On the contrary, if the reference cell and the neighbor cell does not belong to an identical carrier (e.g., the reference cell belongs to a primary cell and the neighbor cell belongs to a secondary cell), measurement of an obtained RSTD may follow the aforementioned inter-frequency RSTD accuracy requirement (refer to following Table 12).

Table 11 shows an example of the intra-frequency RSTD measurement accuracy in 3GPP LTE-A system (release-10) supporting CA.

TABLE 11

| Parameter | Minimum PRS bandwidth between the reference cell and the measured neighbour cell [RB] | Minimum number of available measurement subframes between the reference cell and the measured neighbour cell | Unit | Accuracy [Ts] | Conditions | | | | |
|---|---|---|---|---|---|---|---|---|---|
| | | | | | Bands 1, 4, 6, 10, 11, 18, 19, 21, 23, 24, 33, 34, 35, 36, 37, 38, 39, 40 Io | Bands 2, 5, 7 Io | Band 25 Io | Bands 3, 8, 12, 13, 14, 17, 20, 22 Io | Bands 9, 41, 42, 43 Io |
| RSTD for (PRS Ês/Iot)$_{ref}$ ≥ −6 dB and (PRS Ês/Iot)$_i$ ≥ −13 dB | ≥6 ≥25 ≥50 | 6 ≥2 ≥1 | T$_s$ | ±15 ±6 ±5 | −121 dBm/ 15 kHz ... −50 dBm/ BW$_{Channel}$ | −119 dBm/ 15 kHz ... −50 dBm/ BW$_{Channel}$ | −117.5 dBm/ 15 kHz ... −50 dBm/ BW$_{Channel}$ | −118 dBm/ 15 kHz ... −50 dBm/ BW$_{Channel}$ | −120 dBm/ 15 kHz ... −50 dBm/ BW$_{Channel}$ |

Note 1:
Io is assumed to have constant EPRE across the bandwidth.
Note 2:
Ts is the basic timing unit defined in TS 36.211 [16].
Note 3:
PRS bandwidth is as indicated in prs-Bandwidth in the OTDOA assistance data defined in [24].

each other in carrier frequency (e.g., center frequency of cell). In this case, the above-mentioned 'cell' should be discriminated from a generally used cell that is an area covered by a base station.

Cells used by LTE-A system may include a primary cell (PCell) and a secondary cell (SCell). PCell and SCell may be used as a serving cell. The PCell means the cell operating on a primary frequency (or, a primary CC). The PCell is usable for a user equipment to perform an initial connection establishment process or a connection reconfiguration process. The PCell may include a cell indicated in a handover procedure. The PCell may mean the cell becomes a center of a control related communication in the serving cell configured in a carrier aggregation environment. The SCell may mean the cell operating on a secondary frequency (or, a secondary CC). One PCell is assigned to a specific user equipment, while at least one SCell may be assigned to the specific user equipment. The SCell is configurable only after an RRC connection has been established. And, the SCell may be usable to provide an additional radio resource.

In 3GPP LTE-A system, minimum requirement is defined for RSTD measurement accuracy of a user equipment to which a DL secondary cell is set in environment supporting a carrier aggregation system.

A user equipment may operate in an inter-band or an intra-band carrier aggregation mode. The aforementioned requirement can be applied irrespective of whether the set DL secondary cell is in an activated state or a deactivated state by a MAC control element (MAC CE).

If both a reference cell and a neighbor cell belong to either a primary component carrier or a secondary component carrier, measurement of an obtained RSTD may follow the The RSTD accuracy requirement defined in Table 11 can be applied irrespective of a DRX and can be valid under an assumption that following conditions are satisfied.

Reference sensitivity defined in LTE/LTE-A system (e.g., TS 36.101 7.3) is observed.

In case of a band 1, 4, 6, 10, 11, 18, 19, 21, 23, 24, 33, 34, 35, 36, 37, 38, 39 and 40, PRP 1,2|dBm≥−127 dBm In case of a band 9, 42 and 43, PRP 1,2|dBm≥−126 dBm In case of a band 2, 5, 7 and 41, PRP 1,2|dBm≥−125 dBm In case of a band 3. 8, 12, 13, 14, 17, 20 and 22, PRP 1,2|dBm≥−124 dBm In case of a band 25, PRP 1,2|dBm≥−123.5 dBm There is no overlapped measurement gap in a PRS subframe of a measured cell expectedRSTDUncertainty parameter, which is signaled from E-SMLC (enhanced-serving mobile location center) via LPP protocol, is less than 5 μs.

In the following description, a case of an inter-frequency is explained. As shown in Table 12 (release-10), Table 12 defines RSTD measurement accuracy according to minimum PRS transmission frequency bandwidth of a target neighbor cell and a reference cell, which should be reported by a user equipment for positioning support in the inter-frequency.

Table 12 shows an example of the inter-frequency RSTD measurement accuracy in 3GPP LTE-A system (release-10) supporting CA.

TABLE 12

| Parameter | Minimum PRS bandwidth between the reference cell and the measured neighbour cell [RB] | Minimum number of available measurement subframes between the reference cell and the measured neighbour cell | Unit | Accuracy [Ts] | Conditions | | | | |
|---|---|---|---|---|---|---|---|---|---|
| | | | | | Bands 1, 4, 6, 10, 11, 18, 19, 21, 23, 24, 33, 34, 35, 36, 37, 38, 39, 40 Io | Bands 2, 5, 7 Io | Band 25 Io | Bands 3, 8, 12, 13, 14, 17, 20, 22 Io | Bands 9, 41, 42, 43 Io |
| RSTD for (PRS $\hat{E}s/Iot)_{ref} \geq -6$ dB and (PRS $\hat{E}s/Iot)_i \geq -13$ dB | ≥6 ≥25 ≥50 | ≥4 ≥2 ≥1 | $T_s$ | ±21 ±10 ±9 | −121 dBm/ 15 kHz . . . −50 dBm/ $BW_{Channel}$ | −119 dBm/ 15 kHz . . . −50 dBm/ $BW_{Channel}$ | −117.5 dBm/ 15 kHz . . . −50 dBm/ $BW_{Channel}$ | −118 dBm/ 15 kHz . . . −50 dBm/ $BW_{Channel}$ | −120 dBm/ 15 kHz . . . −50 dBm/ $BW_{Channel}$ |

Note 1:
Io is assumed to have constant EPRE across the bandwidth.
Note 2:
Ts is the basic timing unit defined in TS 36.211 [16].
Note 3:
PRS bandwidth is as indicated in prs-Bandwidth in the OTDOA assistance data defined in [24].

The RSTD accuracy requirement defined in Table 12 can be applied irrespective of a DRX and can be valid under an assumption that following conditions are satisfied.
Reference sensitivity defined in LTE/LTE-A system (e.g., TS 36.101 7.3) is observed.
In case of a band 1, 4, 6, 10, 11, 18, 19, 21, 23, 24, 33, 34, 35, 36, 37, 38, 39 and 40, PRP 1,2|dBm≥−127 dBm
In case of a band 9, 42 and 43, PRP 1,2|dBm≥−126 dBm
In case of a band 2, 5, 7 and 41, PRP 1,2|dBm≥−125 dBm
In case of a band 3, 8, 12, 13, 14, 17, 20 and 22, PRP 1,2|dBm≥−124 dBm
In case of a band 25, PRP 1,2|dBm≥−123.5 dBm
There is no overlapped measurement gap in a PRS subframe of cells belonging to a serving carrier frequency
expectedRSTDUncertainty parameter, which is signaled from E-SMLC (enhanced-serving mobile location center) via LPP protocol, is less than 5 μs.

Method of Measuring a Location of an Enhanced User Equipment

Since a neighbor cell positioned in the vicinity of a serving cell, which includes an identical EARFCN, may have PRS transmission bandwidths different from each other in an actual network, if a channel bandwidth (or operating system bandwidth, operation channel bandwidth) of the serving cell is smaller than a PRS transmission bandwidth of the neighbor cell, lower RSTD accuracy is required. As a result, actual RSTD accuracy may be lowered. Regarding this, it shall be described with reference to FIG. 15 in the following.

Figure 15:
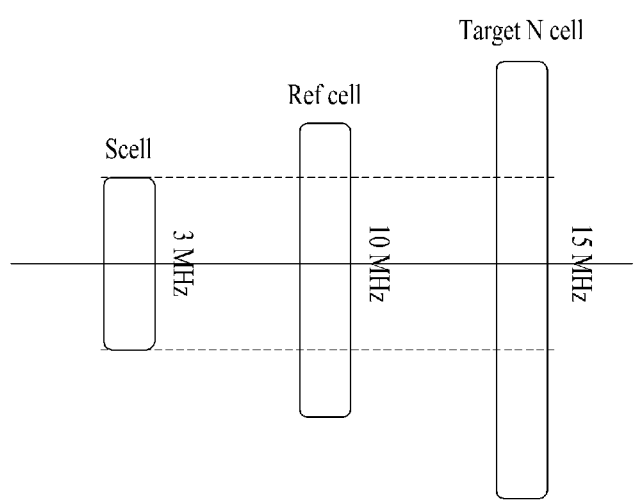
FIG. 15 is a diagram for an example that a PRS transmission bandwidth is different from each other between a serving cell, a reference cell and a target neighboring cell.

FIG. 15 is a diagram for an example that a PRS transmission bandwidth is different from each other between a serving cell, a reference cell and a target neighboring cell.

FIG. 15 shows an example of a situation of measuring RSTD of a contiguous intra-frequency neighbor cell when a serving cell and a reference cell are different from each other in Table 10. Referring back to Table 10, as shown in FIG. 15, if PRS transmission bandwidth of the reference cell corresponds to 10 MHz (i.e., 50 resource blocks) and PRS transmission bandwidth of the target neighbor cell is greater than 15 MHz (i.e., 75 resource blocks), it is able to know that RSTD measurement accuracy corresponds to ±5 Ts.

Yet, as mentioned in the foregoing description, in environment (e.g., 3GPP release-9) not considering RF retuning of a user equipment for a serving cell in an intra-frequency, RSTD accuracy requirement should be considered together with a channel bandwidth of the serving cell. In particular, as shown in FIG. 15, if the channel bandwidth of the serving cell corresponds to 3 MHz (i.e., 15 resource blocks), the RSTD accuracy requirement may change to ±15 Ts. In other word, if required RSTD accuracy is more considerably changed, actual RSTD accuracy can be more degraded. This may occur when PRS is received as much as the channel bandwidth of the serving cell only instead of receiving all of the PRS channel bandwidths of the serving cell, the reference cell and the target cell. In particular, since there is considerable interrelationship between the number of RF units and complexity of a user equipment, this is because RF retuning (e.g., bandwidth change from 3 MHz to 15 MHz) of the user equipment is not permitted due to a burden of additional RF unit.

Unlike the case shown in FIG. 15, when the channel bandwidth of the serving cell is greater than the PRS transmission bandwidth of the neighbor cell, since interference signal is measured instead of the PRS of the neighbor cell on a frequency domain except the PRS transmission bandwidth of the neighbor cell in the frequency domain where the PRS is measured, in order to satisfy measurement accuracy requirement, the interference signal going into a baseband should be eliminated.

Yet, in LTE-A environment supporting carrier aggregation (CA), the number of RF units may vary to receive multicarrier. In particular, RF chain should be separately brought according to each carrier to support a carrier away from a user equipment. Yet, in case of a user equipment supporting intra-contiguous CA, one RF can be brought only. In the latter case, there may exist such an exception as RF reconfiguration and the like. In particular, when a secondary cell is deactivated, RF reconfiguration can be performed according to a measurement cycle (e.g., measCycleSCell parameter) of the secondary cell to measure RSRP/RSRQ of the secondary cell. In particular, if the secondary cell is deactivated and the measurement cycle of the secondary cell is less than 640 ms, a user equipment does not perform RF retuning. The RF retuning of the user equipment can be performed only when the measurement cycle of the secondary cell is greater than 640 ms to save power. In other word, since measurement of the secondary cell is relatively frequently performed when the measurement cycle of the secondary cell is less than 640 ms, a reception bandwidth of the user equipment can be configured by a bandwidth including a primary cell and the deactivated secondary cell.

On the contrary, when the measurement cycle of the secondary cell is greater than 640 ms, since measurement of the secondary cell is relatively infrequently performed, if the reception bandwidth of the user equipment is configured by the bandwidth including both the primary cell and the deactivated secondary cell, power consumption of the user equipment increases. Hence, the reception bandwidth of the user equipment can be configured by the bandwidth including the primary cell and the secondary cell via the RF retuning when measurement of the deactivated secondary cell is performed only. Hence, in this environment, it is necessary to have a scheme of obtaining good RSTD accuracy and an appropriate operation of the user equipment to support the method.

First of all, a scheme of measuring RSTD defined in a legacy 3GPP release 9 not supporting carrier aggregation is explained in the following description.

In case of a non-carrier aggregation (non-CA) of a legacy release 9, RSTD measurement accuracy of a user equipment follows an intra-frequency RSTD measurement accuracy requirement (refer to Table 10 to Table 11). Since RF retuning is not permitted to measure an intra-frequency cell in the non-CA, a measuring count and a RSTD accuracy requirement are determined on the basis of a smallest channel bandwidth among channel bandwidths of a serving cell, a reference cell and a target cell.

Yet, unlike the legacy (release-9), according to release 10, a user equipment equipped with a single RF receiver can optionally perform RF retuning in carrier aggregation environment. In particular, unlike the non-CA, if it is assumed a worst case that a single RF receiver is installed in the user equipment, the RF retuning can also be optionally permitted on an intra-frequency as follows.

In carrier aggregation environment, if a configured secondary cell is in a deactivated state, a user equipment should periodically measure RSRP/RSRQ of the secondary cell to activate the secondary cell. In this case, when a user equipment equipped with a single RF receiver measures a deactivated secondary component carrier, the user equipment can reconfigure a center frequency of the RF receiver. Yet, if the user equipment performs RF retuning in the aforementioned manner, interruption (e.g., packet drop) of a primary cell belonging to a frequency band identical to the measured secondary component carrier may occur. For instance, if a reception bandwidth is configured as a bandwidth including both the primary cell and the secondary cell via the RF retuning, the user equipment can transmit and receive data via the primary cell and may be able to measure the secondary cell at the same time. Yet, loss of data, which is transmitted and received via the primary cell, may occur during prescribed time (i.e., RF retuning time) taken for changing the center frequency of the RF receiver. According to a current LTE-A system, probability of ACK/NACK, which is missed due to the interruption, is granted up to 0.5% only.

The present invention relates to a scheme of measuring RSTD in case that a RF chain is differently applied according to a RF capability of a user equipment when a location of the user equipment is estimated using a positioning reference signal (PRS) among schemes of estimating the location of the user equipment using an OTDOA scheme in user equipments supporting carrier aggregation in LTE-A system currently under discussion in 3GPP. According to a current definition of 3GPP TS36. 133, a user equipment knows a transmission bandwidth on which a PRS of a neighbor cell exists in advance and RSTD measurement accuracy can be satisfied in accordance with the transmission bandwidth. In this case, a channel bandwidth of each target cell (including all of a serving cell, a reference cell and a neighbor cell) and a bandwidth of the PRS are independent from each other. Hence, having received the bandwidth of the PRS of the target cell, the user equipment measures the PRS on the channel bandwidth, calculates RSTD of the serving cell and RSTD of a contiguous target cell and transmits the RSTDs to a base station.

Yet, as mentioned in the foregoing description, unlike a legacy user equipment, a user equipment supporting carrier aggregation is configured to perform RF retuning on an intra-frequency as well. In particular, according to a current 3GPP standard, when a secondary cell is deactivated, a reception band of a user equipment can be reconfigured in consideration of a worst case of using a single RF chain of the user equipment among one of design characteristics of intra-contiguous carrier aggregation in order for the user equipment to measure RSRP/RSRQ of the secondary cell. The RF reconfiguration (or RF retuning) indicates that a user equipment changes a system operation frequency bandwidth in a manner of changing a center frequency (or EARFCN) of an RF (radio frequency) receiver (or RF unit/RF chain). When a similar operation is assumed in order for a user equipment to measure RSTD, in case that the user equipment measures a PRS of a neighbor cell, the user equipment performs RF retuning in consideration of an RPS bandwidth of a reference cell and a target cell to obtain a superior RSTD accuracy. Hence, the present invention proposes a scheme of efficiently measuring RSTD according to a RF capability of the user equipment supporting carrier aggregation and a scheme of measuring a PRS of the user equipment to enhance RSTD accuracy requirement in case that the RF retuning is possible and in case that the RF retuning is impossible.

As mentioned in the foregoing description, since a user equipment equipped with a single RF receiver can optionally perform RF retuning, following description is explained in a manner of being divided into a case of a user equipment equipped with a single RF receiver and a case of a user equipment equipped with two RF receivers. And, a base station can inform a user equipment of information on whether the user equipment measures a PRS in a primary cell or a secondary cell. For clarity, assume that the user equipment measures the PRS in the secondary cell.

Intra-Contiguous Carrier Aggregation—in Case of a Single RF Chain

A user equipment can support two or more cells using a single RF chain. In this case, when the two or more cells are activated, the user equipment operates in a manner of configuring an RF operation system bandwidth to include all of the two or more cells to receive all of the two or more cells. If one or more secondary cells are deactivated, RF reconfiguration of the RF chain can be optionally granted according to a measurement cycle of the secondary cell. In the following, for clarity, assume a case that there is a single secondary cell, by which the present invention may be non-limited. The following description can be identically applied to a case that a single RF chain mounted on a user equipment supports a primary cell and one or more secondary cells.

1) First of all, in case that RF reconfiguration is not permitted, a method for a user equipment to measure RSTD is explained in the following.

Figure 16:
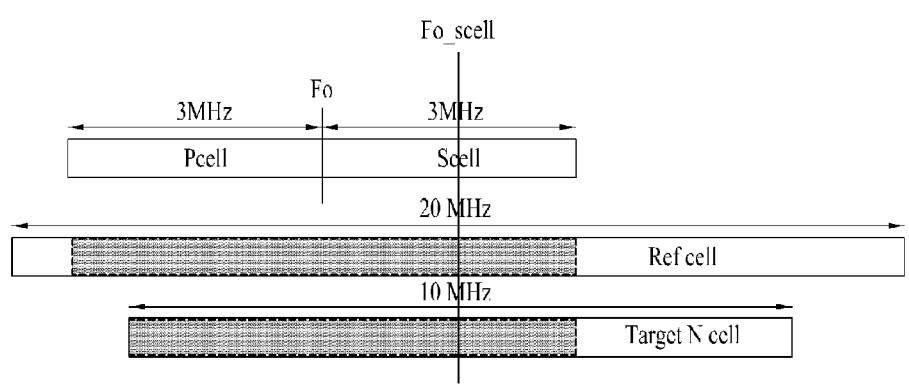
FIGS. 16 to 23 are diagrams for an example of a PRS transmission bandwidth between a serving cell, a reference cell and a target neighboring cell in a carrier aggregation environment according to one embodiment of the present invention.

FIG. 16 is a diagram for an example of a PRS transmission bandwidth between a serving cell, a reference cell and a target neighboring cell in a carrier aggregation environment according to one embodiment of the present invention.

Referring to FIG. 16, it shows an example that an RF chain mounted on a user equipment supports both a primary cell and a secondary cell in intra-contiguous carrier aggregation environment, an operation system bandwidth of the primary cell and an operation system bandwidth of the secondary cell correspond to 3 MHz, respectively and both a reference cell and a target neighbor cell belong to the secondary cell.

First of all, as shown in FIG. 16, since a single RF receiver is mounted on a user equipment, in order for the user equipment to receive both the primary cell and the secondary cell when the primary cell and the secondary cell are activated, the user equipment can operate in a manner of configuring an operation system bandwidth of an RF chain to be a channel bandwidth of 'primary cell+secondary cell' (6 MHz in an example of FIG. 16). In particular, if both the primary cell and the secondary cell are activated, the user equipment can perform data detection and PRS measurement in both cells. Yet, if the secondary cell is activated, RF retuning is not permitted. Hence, as shown in the example of FIG. 16, since both the reference cell and the target neighbor cell belong to either the primary cell or the secondary cell in a state that both the primary cell and the secondary cell are activated (i.e., since a center frequency is matched with each other), the user equipment receives a part represented by a dotted line only among the total bandwidth of the reference cell and the target cell. By doing so, the user equipment may follow an intra-frequency RSTD requirement having a smallest PRS channel bandwidth among the serving cell, the reference cell and the target cell in case of configuring RSTD requirement for the part. In other word, since the user equipment is able to receive a PRS signal included in a minimum bandwidth only, as shown in release-9 (refer to Table 10), the user equipment can configure a parameter for RSTD requirement using the minimum bandwidth among the serving cell, the reference cell and the target neighbor cell. In this case, the parameter for the RSTD requirement can include a parameter related to RSTD measurement accuracy and a parameter related to the number of subframes available for measurement of RSTD.

And, when the secondary cell is deactivated, if the secondary cell measurement cycle is less than 640 ms (measCycleSCell <640 ms), as shown in FIG. 16, the user equipment can operate in a manner of configuring an operation system bandwidth to be a channel bandwidth of 'primary cell+secondary cell' (6 MHz in an example of FIG. 16). This is because, although the secondary cell is deactivated, if the secondary cell measurement cycle is less than 640 ms, 3GPP LTE-A system does not permit RF retuning to measure RSRP and a PRS. As mentioned in the foregoing description, although the secondary cell is deactivated, if the operation channel bandwidth of the user equipment is configured by the channel bandwidth of 'primary cell+secondary cell', since both the reference cell and the target neighbor cell belong to either the primary cell or the secondary cell (i.e., since a center frequency is matched with each other), the user equipment may follow intra-frequency RSTD requirement. In other word, since the user equipment is able to receive a PRS signal included in minimum bandwidth, as shown in release-9 (refer to Table 10), the user equipment can configure a parameter for RSTD requirement using the minimum bandwidth among the serving cell, the reference cell and the target neighbor cell. In this case, the parameter for the RSTD requirement can include a parameter related to RSTD measurement accuracy and a parameter related to the number of subframes available for measurement of RSTD.

2) In case that RF reconfiguration is permitted, a method for a user equipment to measure RSTD is explained in the following.

As mentioned in the foregoing description, if the secondary cell is deactivated and the secondary cell measurement cycle is greater than 640 ms (measCycleSCell ≥640 ms), throughput loss of data detection on ACK/NACK, which is missed due to RF retuning of the user equipment, is granted and RF retuning is permitted to measure a PRS. In this case, an RF retuning operation according to the present invention can be classified into two types in the following.

First of all, a user equipment can change an operation channel bandwidth in consideration of a primary cell and a secondary cell only. Regarding this, it shall be described with reference to FIG. 17 in the following.

Figure 17:
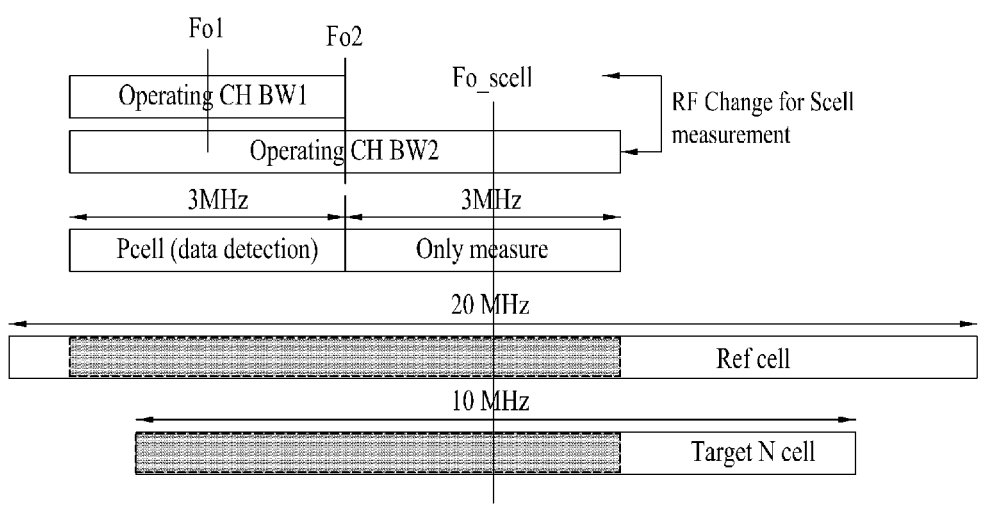

FIG. 17 is a diagram for an example of a PRS transmission bandwidth between a serving cell, a reference cell and a target neighboring cell in a carrier aggregation environment according to one embodiment of the present invention.

Referring to FIG. 17, it shows an example that an RF chain mounted on a user equipment supports both a primary cell and a secondary cell in intra-contiguous carrier aggregation environment, an operation system bandwidth of the primary cell and an operation system bandwidth of the secondary cell correspond to 3 MHz, respectively and both a reference cell and a target neighbor cell belong to the secondary cell. When the primary cell is activated only, if the user equipment performs RF retuning in consideration of a channel bandwidth (3 MHz) of the primary cell and a channel bandwidth (3 MHz) of the secondary cell only to measure a PRS, an operation channel bandwidth of the user equipment can be reconfigured by 6 MHz (3 MHz+3 MHz). Although the secondary cell is in a deactivated state, if the operation channel bandwidth of the user equipment is configured by the channel bandwidth of 'primary cell+secondary cell' by performing the RF retuning, since both the reference cell and the target neighbor cell belong to either the primary cell or the secondary cell (since a center frequency is matched with each other), the user equipment may follow intra-frequency RSTD requirement. In other word, in this case, the user equipment also performs RF reconfiguration such as a channel bandwidth 2 (operating CH BW 2) to measure RSRP of the secondary cell, PRS of the target cell and PRS of the reference cell. Hence, since the user equipment is able to receive a PRS signal included in minimum bandwidth of the serving cell, as shown in release-9 (refer to Table 10), the user equipment can configure a parameter for RSTD requirement using the minimum bandwidth among the serving cell, the reference cell and the target neighbor cell. In this case, the parameter for the RSTD requirement can include a parameter related to RSTD measurement accuracy and a parameter related to the number of subframes available for measurement of RSTD.

Yet, since a bandwidth for PRS measurement becomes wider, the number of measurable samples (i.e., PRS) increases, accuracy of RSTD measurement may increase as well. Hence, the user equipment may change an operation channel bandwidth of the secondary cell in consideration of the reference cell (and/or the target neighbor cell) for more precise measurement in case of performing RF retuning. Regarding this, it shall be described with reference to FIG. 18 in the following.

Figure 18:
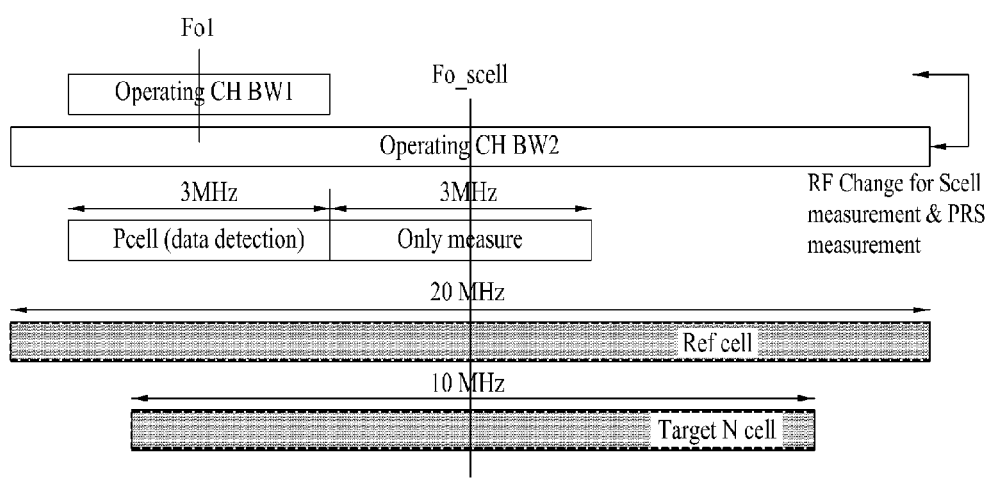

FIG. 18 is a diagram for an example of a PRS transmission bandwidth between a serving cell, a reference cell and a target neighboring cell in a carrier aggregation environment according to one embodiment of the present invention.

Referring to FIG. 18, it shows an example that an RF chain mounted on a user equipment supports both a primary cell and a secondary cell in intra-contiguous carrier aggregation environment, an operation system bandwidth of the primary cell and an operation system bandwidth of the secondary cell correspond to 3 MHz, respectively and both a reference cell and a target neighbor cell belong to the secondary cell. When the primary cell is activated only, if the user equipment performs RF retuning in consideration of the reference cell (20 MHz) to measure a PRS, an operation channel bandwidth of the secondary cell of the user equipment can be reconfigured by 20 MHz. As mentioned earlier in FIG. 17, if the primary cell and the secondary cell are considered only, an operation channel bandwidth of the user equipment may correspond to 6 MHz (3 MHz+3 MHz). Yet, since a PRS transmission bandwidth of the reference cell is greater, the operation channel bandwidth of the secondary cell of the user equipment can be changed on the basis of a greater bandwidth. In particular, the user equipment can perform the RF retuning on the basis of the greater bandwidth among the channel bandwidth of 'primary cell+ secondary cell' and the PRS transmission bandwidth of the reference cell. As mentioned in the foregoing description, although the secondary cell is deactivated, if the operation channel bandwidth of the secondary cell of the user equipment is configured by the biggest channel bandwidth among the channel bandwidth of 'primary cell+secondary cell', the PRS transmission bandwidth of the reference cell and the transmission bandwidth of the target neighbor cell, since both the reference cell and the target neighbor cell belong to the secondary cell (i.e., since a center frequency is matched with each other), the user equipment may follow intra-frequency RSTD requirement. In other word, since the user equipment is able to receive a PRS signal included in minimum bandwidth, the user equipment can configure a parameter for RSTD requirement using the minimum bandwidth. Yet, in case of the present embodiment, since the operation channel bandwidth of the secondary cell is configured by the biggest channel bandwidth among the channel bandwidth of 'primary cell+secondary cell', the PRS transmission bandwidth of the reference cell and the transmission bandwidth of the target neighbor cell, it may not consider the bandwidth of the secondary cell of the user equipment when a minimum bandwidth is determined. In particular, when RF reconfiguration is available, if it is configured to receive a PRS by a maximum bandwidth among the reference cell and the target neighbor cell, the user equipment can configure a parameter for RSTD requirement using a minimum bandwidth among the two PRS bands. In particular, in case of FIG. 18, intra-frequency RSTD requirement of the user equipment does not include the serving cell. Instead, the smallest PRS bandwidth among the reference cell and the target neighbor cell may become a parameter. In this case, the parameter for the RSTD requirement can include a parameter related to RSTD measurement accuracy and a parameter related to the number of subframes available for measurement of RSTD. Yet, as mentioned earlier in the example of FIG. 18, the reference cell and the target neighbor cell may not belong to the secondary cell. Regarding this, it shall be described with reference to FIG. 19 in the following.

Figure 19:
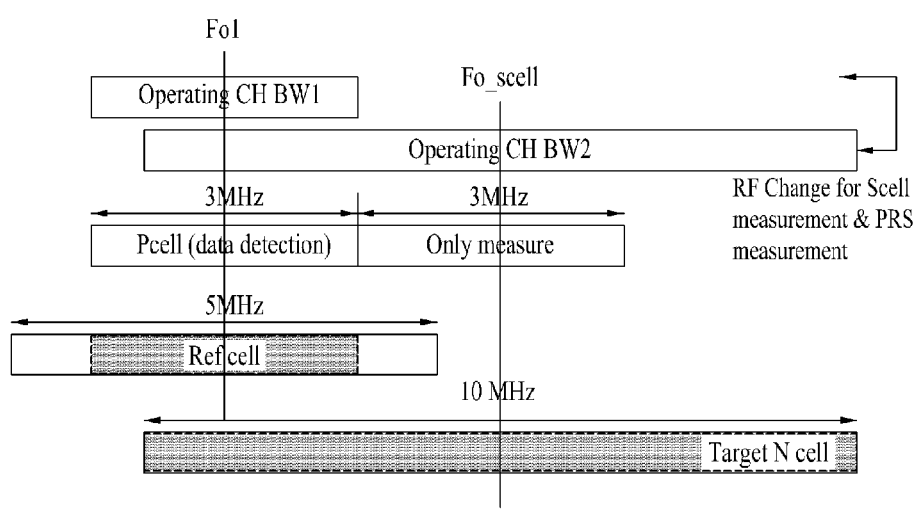

FIG. 19 is a diagram for an example of a PRS transmission bandwidth between a serving cell, a reference cell and a target neighboring cell in a carrier aggregation environment according to one embodiment of the present invention.

Referring to FIG. 19, it shows an example that an RF chain mounted on a user equipment supports both a primary cell and a secondary cell in intra-contiguous carrier aggregation environment, an operation system bandwidth of the primary cell and an operation system bandwidth of the secondary cell correspond to 3 MHz, respectively. Yet, unlike the example of FIG. 18, a target neighbor cell belongs to the secondary cell but a reference cell belongs to the primary cell. In the same manner of the method of FIG. 18, when the primary cell is activated only, the user equipment measure a PRS of the reference cell. The user equipment measures RSRP of the secondary cell and a PRS of the target cell via RF reconfiguration. In this case, a bandwidth (in an example of FIG. 19, a target neighbor cell) can be configured to include both a channel bandwidth of the secondary cell and a transmission bandwidth of the target neighbor cell. Yet, since the user equipment is able to receive a PRS signal included in a minimum bandwidth, the user equipment should consider the minimum bandwidth to configure a parameter for RSTD requirement. Yet, in this case, the reference signal belongs to the primary cell, the user equipment should consider the primary cell too. In particular, as shown in release-9 (refer to Table 10), the user equipment can configure the parameter for the RSTD requirement using the minimum bandwidth among the serving cell, the reference cell and the target neighbor cell. In this case, the parameter for the RSTD requirement can include a parameter related to RSTD measurement accuracy and a parameter related to the number of subframes available for measurement of RSTD.

Intra-Continuous/Intra-Non-Continuous Carrier Aggregation—in Case of Two RF Chains A user equipment can support two or more cells using an independent RF chain, respectively. In this case, when the two or more cells are activated, the user equipment may operate in a manner of configuring an operation system bandwidth of each RF chain to correspond to each of the two or more cells, respectively to receive all of the two or more cells. If one or more secondary cells are deactivated, RF reconfiguration of each RF chain can be freely granted. For clarity, following description is explained in a manner of assuming a case that there is a single secondary cell, by which the present invention may be non-limited. The following description can also be identically applied to a case that three or more RF chains mounted on the user equipment support a primary cell and two or more secondary cells.

1) First of all, in case that RSRP measurement cycle of the secondary cell is less than 640 ms or RF reconfiguration is not permitted because both cells are activated, a method for a user equipment to measure RSTD is explained in the following.

Since the user equipment is equipped with two RF receivers, if all contiguous or non-contiguous cells (i.e., a primary cell and a secondary cell) are activated, the user equipment can operate in a manner of configuring an operation system bandwidth of each RF chain as a primary cell channel bandwidth and a secondary cell channel bandwidth, respectively to receive all of the two cells. In particular, if both the primary cell and the secondary cell are activated, the user equipment can perform data detection and PRS measurement in both cells. Yet, if the secondary cell is activated, RF retuning is not permitted. Hence, if both the reference cell and the target neighbor cell belong to either the primary cell or the secondary cell in a state that both the primary cell and the secondary cell are activated (i.e., since a center frequency is matched with each other), the user equipment may follow an intra-frequency RSTD requirement. In particular, since the user equipment is able to receive a PRS signal included in a minimum bandwidth only, as shown in release-9 (refer to Table 10), the user equipment can configure a parameter for RSTD requirement using the minimum bandwidth among the serving cell, the reference cell and the target neighbor cell.

2) In case that RSRP measurement cycle of the secondary cell exceeds 640 ms or the secondary cell is deactivated, the user equipment can reconfigure RF for a second cell. In this case, a method for the user equipment to measure RSTD is explained in the following.

As mentioned in the foregoing description, if one or more secondary cells are deactivated, RF retuning of a user equipment equipped with a plurality of RF chains can be freely granted. Yet, RSTD measurement operation of the user equipment may vary according to whether both a reference cell and a target cell for PRS measurement belong to an identical cell or cells different from each other.

First of all, a case that the reference cell and the target cell belongs to cells different from each other is explained in the following.

Figure 20:
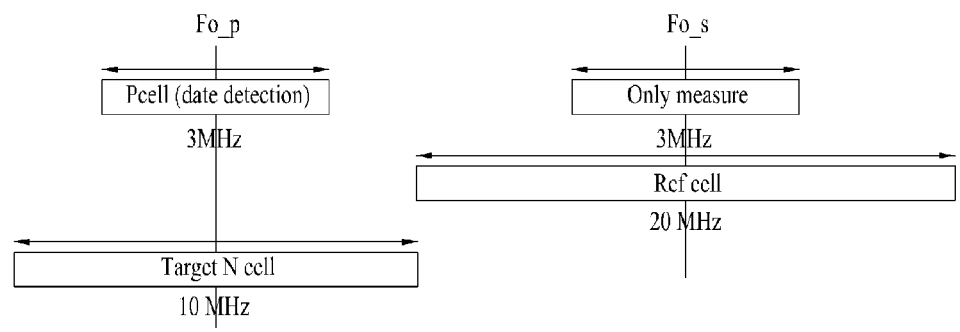

FIG. 20 is a diagram for an example of a PRS transmission bandwidth between a serving cell, a reference cell and a target neighboring cell in a carrier aggregation environment according to one embodiment of the present invention.

Referring to FIG. 20, it shows an example that two RF chains mounted on a user equipment respectively supports a primary cell and a secondary cell in intra-non-contiguous carrier aggregation environment, an operation system bandwidth of the primary cell and an operation system bandwidth of the secondary cell correspond to 3 MHz, respectively, a reference cell belongs to the secondary cell but a target neighbor cell belongs to the primary cell. When the primary cell is activated only, the user equipment makes an RF chain according to the secondary cell operate to measure a PRS and can expand a channel bandwidth of the secondary cell from 3 MHz on the basis of a PRS transmission bandwidth of the reference cell (20 MHz in FIG. 20) by performing RF retuning. Yet, since RF retuning of an RF chain according to the primary cell is not permitted, a PRS value measured in the target neighbor cell can be received by 3 MHz only by an operation system bandwidth of the primary cell. Hence, in this case, as shown in release-9 (refer to Table 10), the user equipment configures a parameter for RSTD requirement using a minimum bandwidth among the serving cell, the reference cell and the target neighbor cell.

Although the example shown in FIG. 20 is explained under an assumption of intra-non-contiguous carrier aggregation environment, the example can also be identically applied to intra-contiguous carrier aggregation environment.

In the following, a case that both the reference cell and the target cell belong to an identical cell (i.e., the primary cell or the secondary cell) is explained.

Figure 21:
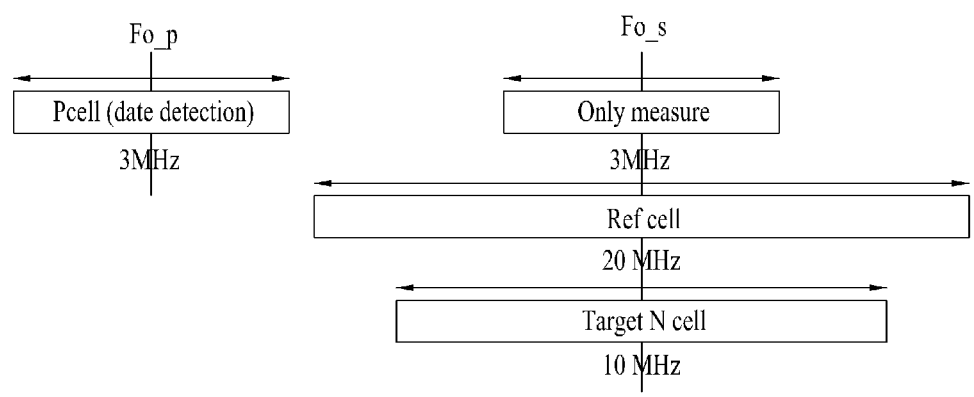

FIG. 21 is a diagram for an example of a PRS transmission bandwidth between a serving cell, a reference cell and a target neighboring cell in a carrier aggregation environment according to one embodiment of the present invention.

Referring to FIG. 21, it shows an example that two RF chains mounted on a user equipment respectively supports a primary cell and a secondary cell in intra-non-contiguous carrier aggregation environment, an operation system bandwidth of the primary cell and an operation system bandwidth of the secondary cell correspond to 3 MHz, respectively, and both a reference cell and a target neighbor cell belong to the secondary cell. When the primary cell is activated only, the user equipment makes an RF chain corresponding to the secondary cell operate to measure a PRS and can expand a channel bandwidth of the secondary cell from 3 MHz on the basis of a biggest PRS transmission bandwidth (20 MHz in FIG. 21) among a PRS transmission bandwidth of the reference cell and a PRS transmission bandwidth of the target neighbor cell by performing RF retuning. In particular, since both the reference cell and the target neighbor cell belong to the secondary cell, the user equipment can configure a parameter for RSTD requirement in consideration of the reference cell and the target neighbor cell only without considering the serving cell in a manner of performing the RF retuning to support the biggest PRS channel bandwidth among the reference cell and the target neighbor cell. In other word, since the user equipment is able to receive a PRS signal included in a minimum bandwidth, the user equipment can configure the parameter for the RSTD requirement using the minimum bandwidth. Yet, in case of the present embodiment, since the operation channel bandwidth of the secondary cell is configured by the biggest bandwidth among the PRS transmission bandwidth of the reference cell and the PRS transmission bandwidth of the target neighbor cell, the bandwidth of the secondary cell of the user equipment may not be considered when the minimum bandwidth is determined.

And, since the operation channel bandwidth of the secondary cell does not affect the decision on the minimum PRS bandwidth, if the secondary cell corresponds to the serving cell, as shown in release-9 (refer to Table 10), the user equipment can configure the parameter for the RSTD requirement using the minimum bandwidth among the serving cell, the reference cell and the target neighbor cell.

Although the example shown in FIG. 20 is explained under an assumption of intra-non-contiguous carrier aggregation environment, the example can also be identically applied to intra-contiguous carrier aggregation environment.

In summary of each of the embodiments explained so far, intra-frequency RSTD measurement accuracy can be defined as follows.

Table 13 shows an example of intra-frequency RSTD measurement accuracy according to the present invention.

TABLE 13

| Parameter | Minimum bandwidth between the serving cell channel BW, the reference cell and the measured neighbour cell PRS BW [RB] note4 | Minimum number of available measurement subframes between the reference cell and the measured neighbour cell | Unit | Accuracy [Ts] | Conditions |||||
|---|---|---|---|---|---|---|---|---|
| | | | | | Bands 1, 4, 6, 10, 11, 18, 19, 21, 33, 34, 35, 36, 37, 38, 39 and 40 Io | Bands 2, 5, 7 Io | Bands 3, 8, 12, 13, 14, 17, 20 Io | Band 9 Io |
| RSTD for (PRS $\hat{E}s/Iot)_{ref} \geq -6$ | $\geq 6$ $\geq 25$ | 6 $\geq 2$ | $T_s$ | $\pm 15$ $\pm 6$ | −121 dBm/ 15 kHz ... | −119 dBm/ 15 kHz ... | −118 dBm/ 15 kHz ... | −120 dBm/ 15 kHz ... |

TABLE 13-continued

| Parameter | Minimum bandwidth between the serving cell channel BW, the reference cell and the measured neighbour cell PRS BW [RB] note4 | Minimum number of available measurement subframes between the reference cell and the measured neighbour cell | Unit | Accuracy [Ts] | Conditions Bands 1, 4, 6, 10, 11, 18, 19, 21, 33, 34, 35, 36, 37, 38, 39 and 40 Io | Bands 2, 5, 7 Io | Bands 3, 8, 12, 13, 14, 17, 20 Io | Band 9 Io |
|---|---|---|---|---|---|---|---|---|
| dB and (PRS Ês/Iot)$_i$ ≥ −13 dB | ≥50 | ≥1 | | ±5 | −50 dBm/ BW$_{Channel}$ | −50 dBm/ BW$_{Channel}$ | −50 dBm/ BW$_{Channel}$ | −50 dBm/ BW$_{Channel}$ |

Note 1:
Io is assumed to have constant EPRE across the bandwidth.
Note 2:
Ts is the basic timing unit defined in 3GPP TS 36.211 [16].
Note 3:
Reference cell and neighbour cell's PRS bandwidths are as indicated in prs-Bandwidth in the OTDOA assistance data defined in [24].
Note 4:
For CA, when the Scell is deactivated & both Reference cell and target neighbour cell belong to Scell, the parameter of minimum BW is determined between the reference cell and the measured neighbour cell PRS BW The RSTD accuracy requirement defined in Table 13 can be applied irrespective of a DRX and can be valid under an assumption that following conditions are satisfied.
  Reference sensitivity defined in LTE/LTE-A system (e.g., TS 36.101 7.3) is observed.
  In case of a band 1, 4, 6, 10, 11, 18, 19, 21, 23, 24, 33, 34, 35, 36, 37, 38, 39 and 40, PRP 1,2|dBm≥−127 dBm
  In case of a band 9, 42 and 43, PRP 1,2|dBm≥−126 dBm
  In case of a band 2, 5, 7 and 41, PRP 1,2|dBm≥−125 dBm
  In case of a band 3, 8, 12, 13, 14, 17, 20 and 22, PRP 1,2|dBm≥−124 dBm
  In case of a band 25, PRP 1,2|dBm≥−123.5 dBm
  There is no overlapped measurement gap in a PRS subframe of a measured cell
  expectedRSTDUncertainty parameter, which is signaled from E-SMLC (enhanced-serving mobile location center) via LPP protocol, is less than 5 μs.

Referring to Table 13, when a minimum PRS bandwidth for inter-frequency RDTD accuracy requirement is configured, a channel bandwidth of the serving cell can be considered together with a PRS transmission bandwidth of the reference cell and a PRS transmission bandwidth of the target neighbor cell. And, if the secondary cell is deactivated in carrier aggregation environment in consideration of the examples shown in FIG. 18 or FIG. 21 and both the reference cell and the target neighbor cell belong to the secondary cell, a condition (Note 4) that the minimum bandwidth parameter can be determined by the PRS bandwidth of the reference cell and the PRS bandwidth of the measured neighbor cell only can be added. And, as mentioned in the foregoing description, since the operation channel bandwidth of the secondary cell does not affect the decision on the minimum PRS bandwidth, if the secondary cell corresponds to the serving cell, the aforementioned condition may not be included.

Meanwhile, in the aforementioned each of the embodiments, when the minimum PRS bandwidth is configured for the inter-frequency RSTD accuracy requirement, the channel bandwidth of the serving cell can be considered. Yet, a decision result for the minimum PRS bandwidth may vary according to whether a criterion for the serving cell is configured by 'primary cell+secondary cell', the primary cell or the secondary cell. Hence, it is necessary to have a standard for determining the serving cell.

First of all, a channel bandwidth of the serving cell can be defined by the sum of a channel bandwidth of the primary cell and a channel bandwidth of the secondary cell. Regarding this, it shall be described with reference to FIG. 20 in the following.

Figure 22:
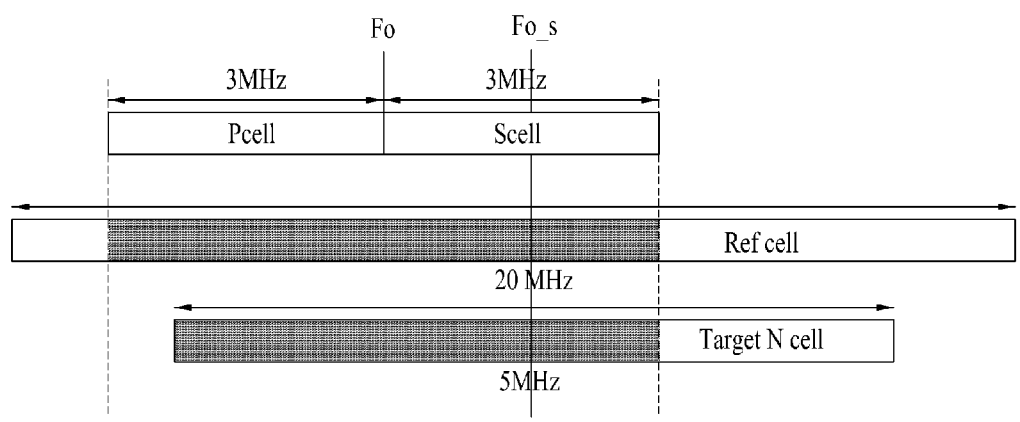

FIG. 22 is a diagram for an example of a PRS transmission bandwidth between a serving cell, a reference cell and a target neighboring cell in a carrier aggregation environment according to one embodiment of the present invention.

Referring to FIG. 22, it shows an example that an RF chain mounted on a user equipment supports both a primary cell and a secondary cell in intra-contiguous carrier aggregation environment, an operation system bandwidth of a primary cell and an operation system bandwidth of a secondary cell correspond to 3 MHz, respectively and both a reference cell and a target neighbor cell belong to the secondary cell. If an operation channel bandwidth is configured to support both the primary cell and the secondary cell, the channel bandwidth becomes 6 MHz. in this case, if it is assumed that the channel bandwidth of the reference cell corresponds to 20 MHz and the channel bandwidth of the target neighbor cell corresponds to 5 MHz, a minimum PRS bandwidth may correspond to 6 MHz, which is the sum of the primary cell and the secondary cell, or 5 MHz of the target neighbor cell. Hence, as RSTD requirement for the minimum PRS bandwidth, ±10 Ts should be satisfied.

In this case, reception of a PRS according to the 5 MHz channel bandwidth should be synchronously secured. Yet, as shown in FIG. 22, when a PRS of the reference cell is received, a problem occurs in a manner that the PRS according to the 5 MHz channel bandwidth is asynchronously received. In particular, in case that a channel bandwidth of the serving cell is defined by the sum of the channel bandwidth of the primary cell and the channel bandwidth of the secondary cell, a center frequency of the serving cell and a center frequency of the reference cell is not matched with each other. Hence, in order to synchronously receive the PRS of the reference cell, it is necessary to perform RF retuning to expand a channel bandwidth. Hence, if a standard of the serving cell is defined by the sum of the channel bandwidth of the primary cell and the channel bandwidth of the secondary cell, the RF retuning is permitted and data loss for the RF retuning can be granted. Yet, definition of the serving cell can be modified as follows.

The channel bandwidth of the serving cell can be defined by one of the channel bandwidth of the primary cell and the channel bandwidth of the secondary cell. In this case, it is able to consider a cell used for measuring a PRS only. For instance, if the both reference cell and the target neighbor cell belong to either the primary cell or the secondary cell, it is able to consider the cell (primary cell or secondary cell) to which both the reference cell and the target neighbor cell belong thereto only. And, if the both reference cell and the target neighbor cell does not belong to either the primary cell or the secondary cell (e.g., if the reference cell belongs to the primary cell and the target neighbor cell belongs to the secondary cell), it is able to consider both the primary cell and the secondary cell. Regarding this, it shall be described with reference to FIG. 23 in the following.

Figure 23:
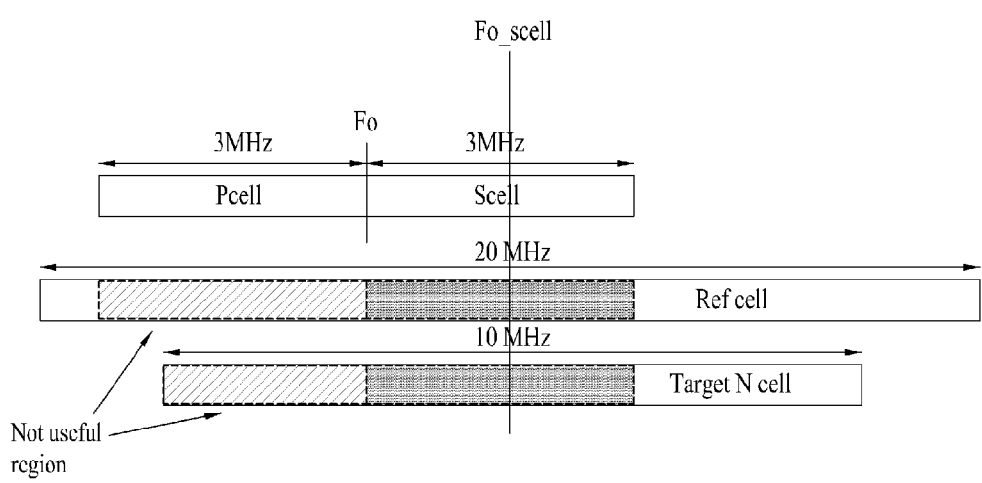

FIG. 23 is a diagram for an example of a PRS transmission bandwidth between a serving cell, a reference cell and a target neighboring cell in a carrier aggregation environment according to one embodiment of the present invention.

Since a reception section of a PRS for RSTD requirement depends on the secondary cell, a parameter for RSTD requirement as shown in release-9 (refer to Table 10) should be configured in consideration of a channel bandwidth of the serving cell. Hence, if the channel bandwidth of the serving cell is configured by the secondary cell (or primary cell), the minimum PRS bandwidth for the RSTD requirement is determined in consideration of the bandwidth of the serving cell (i.e., primary cell or secondary cell), the bandwidth of the reference cell and the bandwidth of the target neighbor cell.

Referring to FIG. 23, it shows an example that an RF chain mounted on a user equipment supports both the primary cell and the secondary cell in intra-contiguous carrier aggregation environment, an operation system bandwidth of the primary cell and an operation system bandwidth of the secondary cell correspond to 3 MHz, respectively and both the reference cell and the target neighbor cell belong to the secondary cell. In the example of FIG. 23, since both the reference cell and the target neighbor cell belong to the secondary cell, the secondary cell is used only to measure a PRS. In this case, the serving cell can be determined as the secondary cell. Hence, since the channel bandwidth of the serving cell (i.e., the secondary cell), the PRS transmission bandwidth of the reference cell and the PRS transmission bandwidth of the target neighbor cell correspond to 3 MHz, 20 MHz and 10 MHz, respectively, the minimum PRS bandwidth can be determined by 3 MHz, which is the channel bandwidth of the serving cell. In particular, a PRS of the reference cell or a PRS of the target neighbor cell transmitted in a region except the channel bandwidth of the secondary cell (serving cell) may not be used for calculating RSTD of the corresponding user equipment.

Referring back to FIGS. 16 and 17, since both the reference cell and the neighbor cell belong to the secondary cell, the secondary cell can be used only to measure a PRS. Hence, the secondary cell can be determined as the serving cell. In this case, since the channel bandwidth of the serving cell, the PRS transmission bandwidth of the reference cell and the PRS transmission bandwidth of the target neighbor cell correspond to 3 MHz, 20 MHz and 10 MHz, respectively, the minimum PRS bandwidth can be determined by 3 MHz, which is the channel bandwidth of the serving cell.

And, referring back to FIG. 19, since both the primary cell and the secondary cell are used for measuring a PRS, it is able to consider both the primary cell (3 MHz) and the secondary cell (10 MHz) of which the RF retuning is performed and may be then able to determine the primary cell (3 MHz) of a smaller bandwidth as the serving cell. In this case, since the channel bandwidth of the serving cell, the PRS transmission bandwidth of the reference cell and the PRS transmission bandwidth of the target neighbor cell correspond to 3 MHz, 20 MHz and 10 MHz, respectively, the minimum PRS bandwidth can be determined by 3 MHz, which is the channel bandwidth of the serving cell.

And, a criterion for determining the serving cell can be applied irrespective of whether there is a single RF chain or a plurality of RF chains.

Referring back to FIG. 20, since both the primary cell and the secondary cell are used for measuring a PRS, it is able to consider both the primary cell (3 MHz) and the secondary cell (10 MHz) of which the RF retuning is performed and may be then able to determine the primary cell (3 MHz) of a smaller bandwidth as the serving cell. In this case, since the channel bandwidth of the serving cell, the PRS transmission bandwidth of the reference cell and the PRS transmission bandwidth of the target neighbor cell correspond to 3 MHz, 20 MHz and 10 MHz, respectively, the minimum PRS bandwidth can be determined by 3 MHz, which is the channel bandwidth of the serving cell.

In the meantime, in case of FIG. 18 and FIG. 21, it is able to consider the reference cell and the target neighbor cell only to determine the minimum PRS bandwidth. Yet, as mentioned in the foregoing description, if the secondary cell corresponds to the serving cell, the secondary cell has no effect on decision of the minimum PRS bandwidth. Hence, as shown in release-9 (refer to Table 10), the minimum PRS bandwidth can be determined in consideration of the serving cell, the reference cell and the target neighbor cell. In particular, if a decision criterion, which defines a channel bandwidth of the serving cell by one of a channel bandwidth of the primary cell and a channel bandwidth of the secondary cell, is identically applied, a parameter for RSTD requirement can be configured like as shown in release-9 (refer to Table 10).

Hence, referring back to FIG. 18, since both the reference cell and the neighbor cell belong to the secondary cell, the secondary cell can be used for measuring a CRS only. Hence, the secondary cell can be determined as the serving cell. In this case, as mentioned in the foregoing description, since the secondary cell corresponds to the serving cell, the minimum PRS bandwidth can be determined in consideration of the serving cell, the reference cell and the target neighbor cell. Hence, since the channel bandwidth of the serving cell (the secondary cell of which RF retuning has performed), the PRS transmission bandwidth of the reference cell and the PRS transmission bandwidth of the target neighbor cell correspond to 20 MHz, 20 MHz and 10 MHz, respectively, the minimum PRS bandwidth can be determined by 10 MHz, which is the channel bandwidth of the target neighbor cell.

And, referring back to FIG. 21, since both the reference cell and the neighbor cell belong to the secondary cell, the secondary cell can be used for measuring a CRS only. Hence, the secondary cell can be determined as the serving cell. In this case, as mentioned in the foregoing description, since the secondary cell corresponds to the serving cell, the minimum PRS bandwidth can be determined in consideration of the serving cell, the reference cell and the target neighbor cell. Hence, since the channel bandwidth of the serving cell (the secondary cell of which RF retuning has performed), the PRS transmission bandwidth of the reference cell and the PRS transmission bandwidth of the target neighbor cell correspond to 20 MHz, 20 MHz and 10 MHz, respectively, the minimum PRS bandwidth can be determined by 10 MHz, which is the channel bandwidth of the target neighbor cell.

Figure 24:
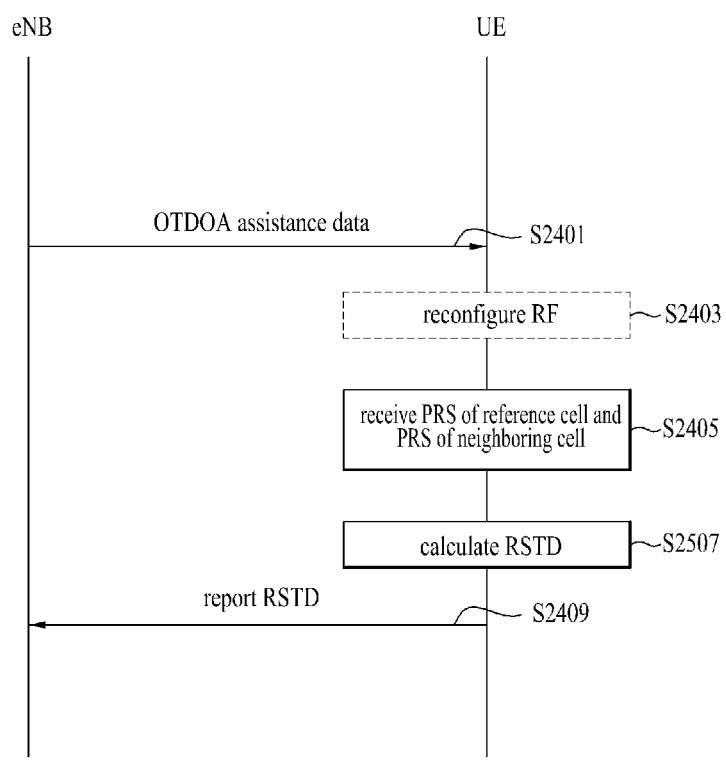
FIG. 24 is a flowchart for an example of a method of measuring a location of a user equipment according to the present invention.

FIG. 24 is a flowchart for an example of a method of measuring a location of a user equipment according to the present invention.

Referring to FIG. 24, a user equipment receives OTDOA assistance data from a base station [S2401]. As mentioned in the foregoing description, the OTDOA assistance data can include information on a reference cell and one or more neighbor cells. In particular, the OTDOA assistance data can include PRS transmission bandwidth information on the reference cell and one or more the neighbor cells. Since detail explanation on the OTDOA assistance data is mentioned earlier, it is omitted at this time.

The user equipment can reconfigure an operation channel bandwidth of an RF chain mounted on the user equipment, if necessary [S2403]. In this case, if one of a PRS transmission bandwidth of the reference cell and a PRS bandwidth of the neighbor cell belongs to a deactivated secondary cell, the user equipment can perform RF reconfiguration (or RF retuning) As mentioned earlier in embodiment, the user equipment can reconfigure an RF operation channel bandwidth in consideration of a channel bandwidth of a primary cell and a channel bandwidth of the secondary cell only. And, the user equipment can reconfigure the RF operation channel bandwidth in consideration of the PRS transmission bandwidth of the reference cell. And, as mentioned in the foregoing description, if a single RF chain is mounted on the user equipment, the RF reconfiguration is optionally permitted according to a measurement cycle (e.g., the measurement cycle of the secondary cell is greater than 640 ms) of the secondary cell. If two RF chains are installed in the user equipment, the RF reconfiguration can be freely permitted.

The user equipment receives a PRS from the reference cell and one or more the neighbor cells [S2405] and measures RSTD using the received PRS of the reference cell and the PRS of the neighbor cell [S2407]. Subsequently, the user equipment reports the measured RSTD to the base station [S2409]. In this case, as mentioned earlier in embodiment, when the user equipment measures the RSTD, a parameter for the RSTD can be configured on the basis of a smallest bandwidth among a channel bandwidth of the serving cell, a PRS transmission bandwidth of the reference cell and a PRS transmission bandwidth of the neighbor cell. As mentioned in the foregoing description, in case of considering the serving cell when the parameter for the RSTD is configured, the serving cell can be defined by 'primary cell+ secondary cell', the primary cell or the secondary cell. And, the parameter for the RSTD can be configured on the basis of a smaller bandwidth among the PRS transmission bandwidth of the reference cell and the PRS transmission bandwidth of the neighbor cell when the parameter is configured by the PRS transmission bandwidth of the reference cell and the PRS transmission bandwidth of the neighbor cell only. And, the parameter for the RSTD can include a parameter related to RSTD measurement accuracy and/or a parameter related to the number of subframes available for measurement of RSTD.

The Generals of Device to which the Present Invention is Applicable

Figure 25:
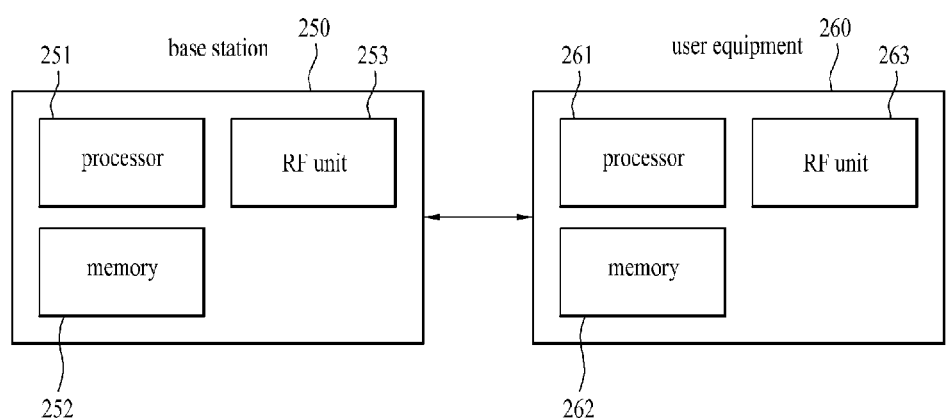
FIG. 25 is a block diagram of a wireless communication device according to one embodiment of the present invention.

FIG. 25 is a block diagram of a wireless communication device according to one embodiment of the present invention.

Referring to FIG. 25, a wireless communication system may include a base station 250 and a plurality of user equipments 340 located within an area of the base station 250.

The base station 250 may include a processor 251, a memory 252 and an RF (radio frequency) unit 253. The processor 251 implements the proposed functions, processes and/or methods. Layers of a radio interface protocol can be implemented by the processor 251. The memory 252 is connected with the processor 251 and then stores various kinds of information to drive the processor 251. The RF unit 253 is connected with the processor 251 and then transmits and/or receives radio signals.

The user equipment 260 includes a processor 261, a memory 262 and an RF unit 263. The processor 261 implements the proposed functions, processes and/or methods. Layers of a radio interface protocol can be implemented by the processor 261. The memory 262 is connected with the processor 261 and then stores various kinds of information to drive the processor 261. The RF unit 263 is connected with the processor 261 and then transmits and/or receives radio signals. In particular, in the present invention, the RF unit 263 indicates the aforementioned RF chain or the RF receiver. And, the RF unit 263 may include one or more RF units. If the RF unit is configured with a plurality of RF units, each of a plurality of the RF units can support a primary cell or one or more secondary cells. And, an operation channel bandwidth of the RF unit 263 can be reconfigured or retuned by a control of the processor 341.

The memory 252/262 may be provided within or outside the processor 251/261. And, the memory 252/262 may be connected with the processor 251/261 via various kinds of well-known means. Moreover, the base station 250 and/or the user equipment 260 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method proposed by the present invention is described with reference to examples applied to 3GPP LTE system, it may be applicable to various kinds of wireless access systems as well as the 3GPP LTE system.

What is claimed is:

1. A method of measuring a location of a user equipment in a wireless access system supporting carrier aggregation, comprising the steps of:
receiving information on a PRS (positioning reference signal) transmission bandwidth of a reference cell and information on a PRS transmission bandwidth of a neighboring cell;
when a secondary cell of the user equipment is deactivated and a measurement cycle of the secondary cell is same as or greater than 640 ms, determining an operation channel bandwidth of an RF (radio frequency) unit of the user equipment based on the PRS transmission band width of the reference cell, the PRS transmission bandwidth of the neighboring cell, and a channel bandwidth of a serving cell of the user equipment,
wherein the channel bandwidth of the serving cell includes a channel bandwidth of a primary cell and the deactivated secondary cell;
if the PRS transmission bandwidth of the reference cell and the PRS transmission bandwidth of the neighboring cell belongs to the deactivated secondary cell, reconfiguring the operation channel bandwidth of the RF (radio frequency) unit of the user equipment to a biggest channel bandwidth among the PRS transmission band width of the reference cell, the PRS transmission bandwidth of the neighboring cell, and the channel bandwidth of the serving cell;
receiving a PRS from the reference cell and the neighboring cell; and
measuring RSTD (reference signal time difference) using the PRS of the reference cell and the PRS of the neighboring cell based on the reconfigured operation channel bandwidth,
wherein a parameter for the RSTD is configured according to a smallest bandwidth among the channel bandwidth of the serving cell, the PRS transmission bandwidth of the reference cell and the PRS transmission bandwidth of the neighboring cell, and
wherein the parameter for the RSTD includes measurement accuracy of the RSTD and a number of subframes available for measurement of the RSTD.

2. The method of claim 1, wherein the information on the PRS transmission bandwidth of the reference cell and the information on the PRS transmission bandwidth of the neighboring cell are transmitted via OTDOA (observed time difference of arrival) assistance data.

3. A user equipment measuring a location of the user equipment in a wireless access system supporting carrier aggregation, comprising:
an RF (radio frequency) unit configured to transmit and receive a radio signal; and
a processor configured to control the RF unit,
wherein the processor is configured to:
receive information on a PRS (positioning reference signal) transmission bandwidth of a reference cell and information on a PRS transmission bandwidth of a neighboring cell,
when a secondary cell of the user equipment is deactivated and a measurement cycle of the secondary cell is same as or greater than 640 ms, determine an operation channel bandwidth of an RF (radio frequency) unit of the user equipment based on the PRS transmission band width of the reference cell, the PRS transmission bandwidth of the neighboring cell, and a channel bandwidth of a serving cell of the user equipment,
wherein the channel bandwidth of the serving cell includes a channel bandwidth of a primary cell and the deactivated secondary cell,
if the PRS transmission bandwidth of the reference cell and the PRS transmission bandwidth of the neighboring cell belong to the deactivated secondary cell, configured to reconfigure the operation channel bandwidth of the RF unit to a biggest channel bandwidth among the PRS transmission band width of the reference cell, the PRS transmission bandwidth of the neighboring cell, and the channel bandwidth of the serving cell,
receive a PRS from the reference cell and the neighboring cell, and
measure RSTD (reference signal time difference) using the PRS of the reference cell and the PRS of the neighboring cell based on the reconfigured operation channel bandwidth,
wherein a parameter for the RSTD is configured according to a smallest bandwidth among the channel bandwidth of the serving cell, the PRS transmission bandwidth of the reference cell and the PRS transmission bandwidth of the neighboring cell, and
wherein the parameter for the RSTD includes measurement accuracy of the RSTD and a number of subframes available for measurement of the RSTD.

4. The user equipment of claim 3, wherein the information on the PRS transmission bandwidth of the reference cell and the information on the PRS transmission bandwidth of the neighboring cell are transmitted via OTDOA (observed time difference of arrival) assistance data.

* * * * *